(12) United States Patent
Hinderling et al.

(10) Patent No.: US 11,703,410 B2
(45) Date of Patent: **\*Jul. 18, 2023**

(54) PRESSIRE SENSOR INCLUDING HEIGHT DETERMINATION WITH IMPROVED FLEXIBILITY AND RELIABILITY

(71) Applicant: HEXAGON TECHNOLOGY CENTER GMBH, Heerbrugg (CH)

(72) Inventors: Jürg Hinderling, Marbach (CH); Wolfgang Rebhandl, Dornbirn (AT); Jochen Scheja, Hohenems (AT); Markus Wenk, Chur (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 0 days.

This patent is subject to a terminal disclaimer.

(21) Appl. No.: 17/879,187

(22) Filed: Aug. 2, 2022

(65) Prior Publication Data

US 2022/0373419 A1 Nov. 24, 2022

Related U.S. Application Data

(63) Continuation of application No. 16/998,972, filed on Aug. 20, 2020, now Pat. No. 11,428,595.

(30) Foreign Application Priority Data

Aug. 21, 2019 (EP) ..................... 19192968
Aug. 21, 2019 (EP) ..................... 19192970

(51) Int. Cl.
*G01L 19/00* (2006.01)
*G01D 1/14* (2006.01)

(52) U.S. Cl.
CPC .......... *G01L 19/0092* (2013.01); *G01D 1/14* (2013.01)

(58) Field of Classification Search
None
See application file for complete search history.

(56) References Cited

U.S. PATENT DOCUMENTS

| 6,473,712 | B1* | 10/2002 | Faye ................. | B60T 8/172 |
| | | | | 702/140 |
| 2013/0124143 | A1* | 5/2013 | Girardey .............. | G01D 1/14 |
| | | | | 702/176 |
| 2015/0069814 | A1* | 3/2015 | Junker ................ | E21C 35/24 |
| | | | | 299/1.7 |

FOREIGN PATENT DOCUMENTS

| CN | 201680836 U | 12/2010 |
| DE | 2739975 A1 | 3/1978 |

(Continued)

OTHER PUBLICATIONS

Miaomiao Hua et al. "A closed-loop adjusting strategy for wireless HART time synchronization" 2011 11th International Symposium on Communications & Information Technologies (ISCIT) Oct. 2011.

(Continued)

*Primary Examiner* — Lisa M Caputo
*Assistant Examiner* — Nigel H Plumb
(74) *Attorney, Agent, or Firm* — Maschoff Brennan

(57) ABSTRACT

An inclination sensor for determining an angle of inclination relative to the gravitational vector includes comprising a fluid container and a first pressure sensor pair configured to measure a hydrostatic pressure in the connecting fluid. Temperature sensors are assigned to the sensors. A processor is configured to determine: a relative height (h) in the direction of gravity between the pressure sensors, an angle of inclination with respect to the gravitational vector based on the determined relative height (h) and the fixed locations (Continued)

of the pressure sensors, and relative height in the direction of gravity and the angle of inclination, also based on the measured temperatures.

20 Claims, 9 Drawing Sheets

(56) References Cited

FOREIGN PATENT DOCUMENTS

| DE | 2739975 | * | 9/1978 |
|----|---------|---|--------|
| DE | 4326706 | * | 4/1994 |
| DE | 4326706 A1 | | 4/1994 |
| DE | 29709876 | * | 6/1997 |
| DE | 29709876 U1 | | 8/1997 |
| DE | 19914727 A1 | | 10/2000 |
| DE | 102010038573 A1 | | 2/2012 |
| EP | 1365210 A2 | | 11/2003 |
| WO | 2013149638 A1 | | 10/2013 |

OTHER PUBLICATIONS

European Search Report in EP Application No. 19192968.6 dated Feb. 11, 2020.
European Search Report in EP Application No. 19192970.2 dated Apr. 20, 2020.

* cited by examiner

PRESSIRE SENSOR INCLUDING HEIGHT DETERMINATION WITH IMPROVED FLEXIBILITY AND RELIABILITY

CROSS-REFERENCE TO RELATED APPLICATIONS

This application claims priority to U.S. patent application Ser. No. 16/998,972 filed on Aug. 20, 2020, which claims priority to European Patent Application No. 19192970.2 filed on Aug. 21, 2019 and European Patent Application No. 19192968.6 filed on Aug. 21, 2019. The foregoing patent applications are hereby incorporated by reference.

TECHNICAL FIELD

The disclosure relates to a device for the determination of relative heights between two points in the direction in which gravity acts and an inclination sensor for single- and/or multi-axis determination of an inclination relative to the vertical direction defined by the gravitational field.

BACKGROUND

In geodesy and in the construction industry, in addition to classic measuring aids such as plumb bobs, folding rules and water level gauges, different measuring devices are used in order to measure or survey vertical distances or distances in the direction in which gravity acts. The measuring devices used most often for this purpose, which are also those that are easiest to operate, are the optical levelling devices with automatically levelling sight lines, line lasers, point lasers and rotary lasers. The height to the points, lines or surfaces that are to be surveyed are then transferred with a metre rule or yardstick from the respective vertical plane, where said plane is usually optically horizontal. The optical levelling devices are fitted with an optical compensator which consists essentially of an optical deflecting prism that is connected to a weighted pendulum. The optical compensator here guarantees that the sight line is levelled. In order to transmit the laser radiation in a levelled manner, the line and point lasers have a laser unit that is fitted onto a gimbal-mounted pendulum. The rotary lasers generate a horizontal plane by means of laser radiation. The rotary lasers also have a gimbal suspension with two crossed bubble tubes as scales for measuring the horizontal line or plane. This bubble tube assembly is adjusted by means of motor-driven adjusting units in such a way that the laser plane generated by rotation is aligned horizontally or inclined in a specific direction at a defined angle to the horizontal plane. Such measuring devices are typically employed over distances of up to 100 m, while the precision of the height marking and the height transfer can be better than 1 mm. Measuring devices such as tachymeters or total stations are also suitable for accurate height measurements. These measuring devices are, however, too complex to operate and too expensive for simple measuring tasks.

What is missing is a convenient measuring device for transferring heights from a point, for example from a reference height mark outside a building site, to an arbitrary point on the building site. It should be possible for the task to be carried out by a single person, in addition to which the measuring device should be light and compact in construction, so that it can be used while carried by hand. Conventional measuring devices need to be erected in a defined, stable manner in order to be able to carry out the electronic self-levelling. For example, a line laser is not capable of achieving an automatic alignment when carried by hand. In addition, the absolute height of the measuring device, for example of the line laser, with reference to defined reference points is uncertain after it has been erected on the building site. Additional measuring aids such as a folding rule or yardstick are needed to determine the height of the measuring device or the height of the laser beam, which is complex and can lead to incorrect measurements. A purely exemplary workflow comprises the height transfer from a reference height mark $H_0$ placed outside a building site to the grounds of the building site. This occurs particularly in the phase of excavation and preparing the foundations. After this, at each further phase in construction, for example when creating the storey floors of a building, further heights from the reference height $H_0$ are derived and surveyed using measuring devices. This process nowadays is complex and error-prone. Precisely such workflows should, for example, be simplified and improved with a convenient device for determining relative heights.

Furthermore, in surveying and in the construction industry, many measuring instruments have sensors to measure the inclination, in particular to determine the angle of inclination, in relation to the vertical direction defined by the gravitational field. In most cases, these measuring devices are used to determine, for example, the position of an object or a surface. A plurality of such measuring devices exists, which are designed in varying degrees of complexity depending on the respective measuring accuracy. What has been absent up to now, however, is an inclination sensor which can perform a single-axis or multi-axis measurement of the angle of inclination or the inclination in relation to the vertical direction both inexpensively and accurately over the full range of 360° degrees.

It is therefore an object to provide a device for the determination of relative heights which, in comparison with measuring devices of the prior art, is easier to handle, can be employed more flexibly and is at the same time more robust in terms of measurement reliability.

It is therefore a further object to provide an inclination sensor for single- and/or multi-axis inclination determination, which can be implemented cost-effectively and can measure accurately over the full measurement range of 360° around the vertical direction.

SUMMARY

First Aspects

First aspects relate to a device for the determination of relative heights between two points with a connecting hose filled with a liquid and having two opposite ends, a first and a second pressure sensor, arranged at the opposite ends of the connecting hose, wherein the pressure sensors are connected to one another via the liquid and the liquid is sealed from the outside in a gastight manner by the connecting hose, and wherein the first pressure sensor is configured to measure a hydrostatic pressure of the liquid at the one end of the connecting hose in the liquid and the second pressure sensor is configured to measure a hydrostatic pressure of the liquid at the other end of the connecting hose that is opposite to the one end, in the liquid, and a processor that is configured to determine a relative height between a first reference point with a fixed positional relationship to the first pressure sensor and a second reference point with a fixed positional relationship to the second pressure sensor on the basis of the hydrostatic pressures measured by the first and second pressure sensors, wherein the measured hydrostatic pressures can be assigned by the processor to the same common measurement time point, and the determination of the relative height takes place on that basis.

According to one form of embodiment, the device can comprise a first and a second temperature sensor, wherein each of the temperature sensors is assigned to a pressure sensor, the first temperature sensor is configured to measure the temperature at the first pressure sensor, in particular in the liquid, the second temperature sensor is configured to measure the temperature at the second pressure sensor, in particular in the liquid, and the processor is configured to determine the relative height also on the basis of the measured temperatures, in particular in order to take thermal influences on the relative height (h) into consideration.

According to a further form of embodiment, the device can comprise a synchronizer, wherein the synchronizer is configured to synchronize a first measurement time point at which the first pressure and/or temperature sensor measures with a second measurement time point at which the second pressure and/or temperature sensor measures, wherein the processor is configured to assign the measured hydrostatic pressures to the same, common measurement time point on the basis of the synchronized measurement time points.

In an advantageous form of embodiment, the device can comprise a respective wireless module at each end of the connecting hose, wherein the sensors are connected to the respective wireless module, and the wireless modules are configured to receive and to process a wireless trigger signal, and wherein the synchronizer is configured to synchronize the measurement time points on the basis of a wireless trigger signal, so that the sensors measure pressure and/or temperature in a synchronized manner on the basis of the wireless trigger signal.

According to a further form of embodiment, the device can comprise further pressure sensors at each end of the connecting hose, wherein the pressure sensors at the respective end of the connecting hose are arranged around a common centre point and have a fixed positional relationship to one another, wherein the processor is configured to determine the relative height on the basis of mean values of the pressures measured by means of the pressure sensors at the respective end of the connecting hose, and/or to determine an orientation of the respective end of the connecting hose in relation to a reference point on the basis of the pressures measured at the respective end of the connecting hose by means of the pressure sensors, in particular pressure differences, and also to determine the relative height on the basis of the orientation.

According to an advantageous form of embodiment of the device, this can comprise further temperature sensors and the connecting hose can have multiple temperature measurement regions distributed over its length, wherein at least one of the further temperature sensors is assigned to each temperature measurement region, the further temperature sensors are configured to measure the temperature in the assigned temperature measurement region, in particular in the liquid, and the processor is configured to determine the relative height (h) also on the basis of the temperatures measured in the temperature measurement regions of the connecting hose, in particular in order to take thermal influences on the relative height (h) into consideration.

According to a further advantageous form of embodiment of the device, the connecting hose can comprise a first (44) and a second hose compartment (45), wherein the hose compartments are separate from one another and extend adjacent to one another along the connecting hose, the first hose compartment (44) is filled with the liquid connecting the pressure sensors and the second hose compartment (45) provides a circulation region for a medium that can move therein.

According to one specific form of embodiment, the processor can comprise a calibration functionality and be configured to determine a relative height between two reference points on the basis of determined hydrostatic pressure differences, wherein the determined hydrostatic pressure differences are assigned by the processor to relative heights by means of a calibration relationship, and to determine the calibration relationship by means of the calibration functionality on the basis of a defined positioning of the two ends of the connecting hose relative to one another.

In a further possible form of embodiment of the device, multiple reference points with a fixed positional relationship to one pressure sensor are assigned to that pressure sensor.

According to one specific form of embodiment, the device can comprise a respective orientation measuring module at both ends of the connecting hose, wherein the orientation measuring modules comprise at least one acceleration sensor and are configured to determine the orientation of the respective pressure sensor in relation to a reference point with a fixed positional relationship to the respective pressure sensor, and the processor is configured to determine the relative height on the basis of the orientation of the pressure sensors, in particular wherein the respective components are integrated into a respective housing, designed and configured to be hand-carried, at each end of the connecting hose. Components can here, for example, be a selection from: pressure sensor, processor, temperature sensor, synchronizer, wireless module, orientation measuring module.

In a further form of embodiment, the device can comprise a pressure compensating vessel at one end of the connecting hose, wherein the pressure compensating vessel is configured to establish and hold constant a base pressure in the connecting hose and/or to compensate for and/or limit an excess or negative pressure in the connecting hose with respect to an external air pressure.

According to a further form of embodiment, the device can comprise an optical position-resolving detector (OAD) at one end of the connecting hose, wherein the optical OAD has a fixed positional relationship to the pressure sensor and is configured to detect optical reference radiation in a position-sensitive manner at an OAD point, and wherein the processor is configured to ascertain an OAD height between the pressure sensor and the OAD point, and to determine the relative height on the basis of the OAD height, in particular to determine the relative height between a reference point and the OAD point.

In one form of embodiment the device can comprise a display and/or an input keyboard with operating fields at least one end of the connecting hose, wherein the processor is configured to display, at the respective end of the connecting hose, information relating to the measured temperatures and pressures, in particular relative height positions of the connecting hose ends and the relative height via the display and/or to execute instructions that are input via the operating fields of the input keyboard.

According to one form of embodiment, the processor can be configured to be controlled remotely by a mobile computer with a display, in particular a touchscreen, and to display information relating to the measured temperatures and pressures, in particular relative height positions of the connecting hose ends and the relative height, via the display of the mobile computer.

In a further possible form of embodiment, the device can comprise a holder at least one end of the connecting hose, wherein the holder is designed to receive and fix a mobile computer in place.

According to one form of embodiment, the device can comprise an optical distance measuring device with an inclination sensor at one end of the connecting hose, wherein the optical distance measuring device has a fixed positional and orientational relationship to the pressure sensor and is configured to measure absolute distances to targeted points by means of optical distance measuring radiation, and wherein the processor is configured to determine the relative height between the one first reference point and the point targeted by the optical distance measuring device on the basis of the determined relative height between the one first and the one second reference point, the inclination of the optical distance measuring radiation measured by means of the inclination sensor, and the distance measured to a targeted point.

In a further form of embodiment, the device can comprise: a coupling device at least one end of the connecting hose, wherein the coupling device is configured to couple and then uncouple further measuring devices, and to provide an accordingly coupled or uncoupled state to the processor as a coupling status, an electronic identification mark at least one end of the connecting hose, and a reading device for electronic identification marks, wherein the processor is configured to determine a relative height also on the basis of at least one electronic identification mark read by the reading device and on the basis of the coupling status.

In one specific form of embodiment, the device can comprise a reflector at one end of the connecting hose, wherein the reflector comprises a reference point that has a fixed positional relationship to the pressure sensor and is configured to reflect reference radiation of a measuring device, wherein the determination of the relative height takes place on the basis of the reference point of the reflector and/or of a signal generator, wherein the processor is connected to the signal generator and is configured to output a signal via the signal generator on the basis of a predefined criterion that relates to the determination of a relative height.

According to a further specific form of embodiment, the device can comprise a respective electronic board at both ends of the connecting hose comprising a wireless module, an orientation measuring module, a temperature sensor and a pressure sensor and connects them to one another via a data connection, as well as a first connecting piece at the one end of the connecting hose, a second connecting piece at the other end of the connecting hose that is opposite to the one end, and a tablet computer or a smartphone, wherein the first connecting piece connects the connecting hose, the pressure sensor, a pressure compensation vessel and a bleed valve rigidly together, and the second connecting piece connects the connecting hose and the pressure sensor rigidly together, in particular wherein the connecting hose is pulled in each case over a connecting region of the first and second connecting pieces, and wherein the wireless modules and the tablet computer or the smart phone provide a data connection between them in order to control the device.

According to a further form of embodiment of the device, the opposite ends of the connecting hose can be rigidly connected together in a specific positional relationship to one another, wherein the processor is configured to determine an angle of inclination between the opposite ends of the connecting hose on the basis of the determined positional relationship and the determined relative height between a reference point assigned to the one end of the connecting hose and a reference point assigned to the other end of the connecting hose.

According to a further form of embodiment, it can comprise a first extensible electronic measuring tape with a distance transducer at one end of the connecting hose, wherein the distance transducer is configured to assign, to an extended state of the measuring tape, a distance thereby surveyed in relation to the one end of the connecting hose, in particular wherein the measuring tape comprises a fixed end and an extensible end, and the extensible end is attached to the other end opposite to the one end of the connecting hose, and the processor is configured to determine a horizontal distance between the two ends of the connecting hose on the basis of the determined relative height h and the distance surveyed between the two ends of the connecting hose.

According to a further specific form of embodiment, the device can comprise a second extensible electronic measuring tape at the one end of the connecting hose, wherein the first and second measuring tapes form a unit, the unit comprises an angle transducer, and the angle transducer is configured to determine a measured angular value for an angle enclosed between a distance surveyed by means of the first measuring tape and a distance surveyed by means of the second measuring tape.

Second Aspects

Second aspects relate to an inclination sensor for determining an inclination angle or inclination relative to the vertical direction defined by the gravitational field. The proposed inclination sensor has a fluid container filled with a fluid which is sealed in a gastight manner against an external atmosphere by said fluid container as a connecting fluid, a first pressure sensor pair having a first and a second pressure sensor, wherein the first and second pressure sensors are arranged in an edge region of the fluid container such that they are connected to each other by the connecting fluid, and have a fixed and defined positional relation to each other and thus a fixed and defined distance apart, and wherein the first and the second pressure sensor are each configured to measure a hydrostatic pressure in the connecting fluid, and a processor which is configured to determine a relative height h in the direction of gravity between the first and the second pressure sensor based on the hydrostatic pressures measured by the first and second pressure sensor, wherein the measured hydrostatic pressures can be assigned by the processor to an identical common measurement time, and an angle of inclination in relation to the vertical direction based on the determined relative height and the fixed and defined distance between the pressure sensors.

The processor can also be configured to determine a relative height between a first reference point with a fixed and defined positional relationship to the first pressure sensor and a second reference point with a fixed and defined positional relationship to the second pressure sensor, based on the hydrostatic pressures measured by the first and the second pressure sensor. The angle of inclination can then be determined in relation to the vertical direction based on the determined relative height between the two reference points and the fixed and defined distance between the two reference points.

According to a preferred embodiment of the inclination sensor, it can have a first and a second temperature sensor, wherein each of the temperature sensors is assigned to a pressure sensor and the first temperature sensor is configured to measure the temperature at the first pressure sensor, in particular in the connecting fluid, the second temperature sensor is configured to measure the temperature at the second pressure sensor, in particular in the connecting fluid, and the processor is configured to determine the relative height in the direction of gravity and the angle of inclination, also based on the measured temperatures, in particular based on a measured temperature difference, wherein a temperature gradient existing between the two pressure sensors in the connecting fluid is also taken into account in determining the angle of inclination.

According to an advantageous embodiment of the inclination sensor, the pressure sensors and/or temperature sensors can be electrically connected to each other. The inclination sensor can then have a synchronizer, wherein the synchronizer is configured to synchronize a first measurement time, at which the first pressure and/or temperature sensor measures, with a second measurement time, at which the second pressure and/or temperature sensor measures, by means of an electrical trigger signal, or to synchronize hydrostatic pressures and/or temperatures measured asynchronously by the pressure sensors and/or temperature sensors over time, wherein the measured hydrostatic pressures and/or temperatures can be assigned to an identical common measurement time based on the result.

According to a further embodiment of the inclination sensor, a first pressure sensor pair can have at least one additional first and one additional second pressure sensor, wherein the processor is configured to average the hydrostatic pressures measured by the first pressure sensors and to average the hydrostatic pressures measured by the second pressure sensors and to determine an angle of inclination based on the results.

According to a further embodiment of the inclination sensor the fluid container can be a tube or hose with two opposite ends, wherein the first pressure sensor is arranged at one end and the second pressure sensor is arranged at the other end of the hose opposite the first end.

According to a further embodiment the inclination sensor can have a housing which has the tube or hose, the sensors and the processor, wherein the positional relation and the distance apart of the pressure sensors is fixed and defined by the housing.

In a further embodiment of the inclination sensor the fluid container can be a spiral hose with two opposite ends, wherein the first pressure sensor is arranged at one end and the second pressure sensor at the other end of the spiral hose, opposite the first end.

According to one embodiment of the inclination sensor, it can have a telescopic housing which comprises the spiral hose, the sensors and the processor, wherein the positional relation and thus the distance between the pressure sensors is fixed and defined by the telescopic housing, the telescopic housing mainly has two housing parts and each housing part fixes one of the two ends of the spiral hose and thus a pressure sensor, and the two housing parts can be moved relative to each other along a common axis to predefined positions.

A distance between the pressure sensors that changes with the relative position of the housing parts to each other can be determined and defined, for example, by means of an additional distance meter. Similarly, by purely constructional means the telescopic housing could limit the possible adjustable positions of the housing parts relative to each other to predefined positions, the predefined positions being assigned defined distances between the pressure sensors.

According to an alternative embodiment, the inclination sensor may have further pressure sensor pairs, these pressure sensor pairs being arranged on pressure sensor pair axes arranged at a defined angle to each other, in particular orthogonal to each other, and wherein the processor is also configured to determine in pairs a relative height in the direction of gravity between two pressure sensors of each pressure sensor pair based on the hydrostatic pressures measured by the two pressure sensors, wherein the hydrostatic pressures measured by the two pressure sensors of each pair can be assigned by the processor to an identical common measurement time, and at least one angle of inclination in relation to the vertical direction based on a relative height determined in pairs for a pressure sensor pair and on the fixed and defined distance between the two pressure sensors of the pressure sensor pair.

It should be noted that the inclination sensor can also have an odd number of pressure sensors. If the inclination sensor has more than two pressure sensors, the same pressure sensor can be a pressure sensor of different pressure sensor pairs. For example, three pressure sensors can form three pressure sensor pairs, wherein each pressure sensor can be assigned to two pressure sensor pairs.

According to another alternative embodiment, the fluid container can be disc- or plate-shaped and have two main surfaces which are substantially parallel to each other, wherein the pressure sensors of a pressure sensor pair are arranged opposite each other, in particular diametrically opposite, in relation to a centre of the fluid container designed in the shape of a disc or plate, at the edge region thereof.

According to another alternative embodiment, the fluid container of the inclination sensor can be toroidal in shape and have a rotational axis, wherein the pressure sensors of a pressure sensor pair are arranged opposite each other, in particular diametrically opposite with respect to a torus diameter, in the region of an outer circumference of the toroidal fluid container.

According to another alternative embodiment of the inclination sensor, the fluid container can be spherical and have a sphere centre, wherein the pressure sensors of a pressure sensor pair are arranged opposite each other, in particular diametrically opposite, in relation to a centre of the sphere at the edge region thereof.

According to an advantageous alternative embodiment of the inclination sensor, the additional pressure sensor pairs correspond to a second and a third pressure sensor pair with a third, fourth, fifth and sixth pressure sensor, wherein the fluid container is cube-shaped, in particular having six cube faces and a cube centre, and the pressure sensors of a pressure sensor pair are arranged opposite each other in relation to the cube centre in the region of the cube faces and each pressure sensor is assigned to one cube face.

The cube-shaped fluid container can also be designed as an octahedron, dodecahedron, icosahedron, etc. with a number of pressure sensor pairs corresponding to the number of cube faces.

According to another advantageous alternative embodiment of the inclination sensor, the cube-shaped fluid container can have a connecting channel, which is filled with the connecting fluid and is designed to connect the pressure sensors of at least one pressure sensor pair via the connecting fluid, in particular to connect the pressure sensors of the three pressure sensor pairs to each other via the connecting fluid, wherein the connecting channel has three connecting sub-channels, and two pressure sensors of a pressure sensor pair are assigned to each connecting sub-channel and the connecting sub-channels are designed to connect the two pressure sensors of the respectively assigned pressure sensor pair via the connecting fluid, in particular wherein the three connecting sub-channels are arranged orthogonally to each other.

According to a further embodiment of the inclination sensor, it can have a pressure equalization vessel, wherein the pressure equalization vessel is configured to set and maintain constant a base pressure in the fluid container and/or to equalize and/or limit an excess or negative pressure in the fluid container in relation to an external air pressure.

According to a further embodiment of the inclination sensor, it can have a display which is connected to the processor and configured to display information relating to at least one of a measured hydrostatic pressure, a determined relative height, and a determined inclination angle.

BRIEF DESCRIPTION OF THE FIGURES

Aspects are described in more detail below, purely by way of example, with reference to concrete exemplary embodiments illustrated schematically in the drawings, wherein further advantages of first and second aspects are also considered. FIGS. 1 to 14 relate to the first aspects. In detail:

FIG. 1 shows a schematic form of embodiment of a device according to first aspects for the determination of relative heights;

FIG. 2 shows a form of embodiment of the device with a housing;

FIG. 5 shows a further form of embodiment of the device coupled to a rotary laser;

FIG. 6 shows a further form of embodiment of the device with an OAD interacting with a rotary laser;

FIG. 8 shows a possible measuring mode of the device;

FIG. 9 shows a form of embodiment of the device with a reflector at one end of the connecting hose;

FIG. 10 shows possible arrangements of the pressure sensors at the respective ends of the connecting hose;

FIG. 11 shows a possible form of embodiment of the device;

FIG. 12 shows a possible form of embodiment of the device primarily for horizontal levelling;

FIG. 13 shows a possible form of embodiment of the device for surveying points, for example in the grounds; and FIG. 14 shows a possible form of embodiment of the device relating to the structure of the connecting hose.

FIG. 15 shows components of an inclination sensor according to second aspects for determining an inclination relative to a vertical direction;

FIG. 16 shows possible embodiments of the inclination sensor with a one-part and two-part housing;

FIG. 17 shows further possible embodiments of the inclination sensor having a plurality of pressure sensor pairs; and FIG. 18 shows a specific embodiment of the inclination sensor with a cube-shaped fluid container and three pressure sensor pairs.

The Figures related to the first aspects, i.e. FIGS. 1 to 14, and the second aspects, i.e. FIGS. 15 to 18, do not use the same numerals to indicate the same features.

DETAILED DESCRIPTION

First Aspects

The device, and thus the arrangements at the two ends of the connecting hose, are of small physical size and light-weight construction, so that the device can be carried by hand and operated by batteries. The measuring device consists primarily of two end pieces/boxes that are connected together by a connecting hose that is filled with a liquid. A height measurement/determination of the relative height essentially takes place between the two end pieces/boxes. The device is suitable for a wide range of measurement procedures or processes. The relative height between the two end pieces/boxes can, for example, be determined directly, or the first box can be deposited as a stationary reference point and a relative height between two height lines or horizontal surfaces can be measured with the second box by means of repositioning. A height of a first spot height can, furthermore, be transferred to another spot height at the same height, and surveyed in that the first box is fixed in place at the one spot height and the second box used in a mobile manner for surveying.

Figure 1:
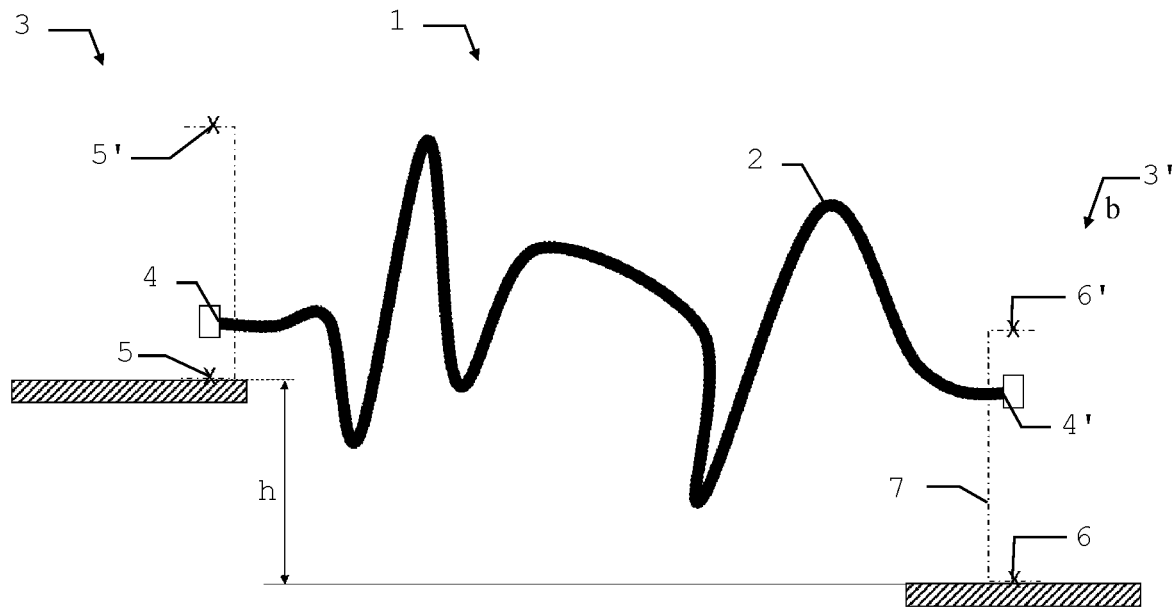

FIG. 1 shows a schematic form of embodiment of a device according to first aspects for the determination of relative heights between two points or lines.

The device 1 comprises a connecting hose 2 filled with a liquid. The connecting hose 2 is advantageously based on polymer and flexible. The hose material here has a high resistance to chemicals and, in particular, good compatibility with the liquid with which the connecting hose 2 is filled. The hose material also forms a sufficiently efficient diffusion barrier for gaseous materials, in particular moisture, oxygen, $CO_2$ and nitrogen. The connecting hose 2 can, for example, be manufactured from a polymer that has sufficiently high stiffness for the application, taking into account the corresponding hose geometry, so that in operation elastic deformations in the hose material are sufficiently small, and a settling time for the height measurement is thus short. The same applies in a similar manner to the temperature stability of the hose material. To design the device 1 so that it is easy to handle, the connecting hose 2 is flexible, and is ideally a spiral hose, whereby winding the connecting hose 2 onto a roller is unnecessary. Because of the structure of a spiral hose, it is elastically deformable or extensible as far as the structure itself is concerned. The connecting hose 2 can, for example, be based on PVC, PU or also on silicone. The connecting hose 2 can also consist of a type of composite polymer material. In this case, a polymer is deliberately combined with a reinforcing phase in the form of, for example, short fibres, fibres or fabrics, whereby the mechanical properties of the hose material are improved. This connecting hose is completely filled with a liquid, so that no air enclosures are present. The choice of liquid here is matched to the material properties of the connecting hose material and should in particular have a freezing point below −20° C. Various oils such as silicone oil, transformer oil, mineral oil, a mixture of ethylene glycol and water, weak acids, alcohols or other organic liquids, for example, are suitable for this purpose.

The connecting hose 2 comprises two opposite ends 3 and 3'. These ends are each closed off by a pressure sensor 4 and 4' in such a way that these two pressure sensors 4, 4' are connected together via the liquid. The pressure sensors 4, 4' are here arranged at the respective end of the hose in such a way that they can measure the hydrostatic pressure in the liquid at the respective end 3, 3' of the connecting hose. A pressure sensor can here also be part of a sensor module, wherein the sensor module closes off the end of the connecting hose in such a way that the hydrostatic pressure in the liquid can be measured. The arrangement of a sensor at each of the opposite ends 3, 3' of the connecting hose permits an in particular simultaneous measurement of the hydrostatic pressure at the two opposite ends of the connecting hose 2 in the same liquid.

The device 1 furthermore comprises a processor. This processor is part of a hardware that comprises the electronic and microelectronic components, storage media and interfaces necessary to process, to store, to transmit and to receive data and/or signals. The hardware can also comprise one or more potentially different cooling devices, for example fans for generating an air circulation for temperature-controlled operation of the hardware. The processor can also here comprise a plurality of in particular functionally interlinked individual processors. All these components are, for example, mounted on one or more interconnected circuit boards/electronic boards. At each end 3, 3' of the connecting hose, the device also comprises at least one reference point 5, 5' or 6, 6'. This reference point has a fixed positional relationship to the respective pressure sensor 4, 4'. The positional relationship between the pressure sensor and the reference point can here be fixed in place by means of a housing 7. Ideally then, as shown by way of example in FIG. 2, the connecting hose end and the pressure sensor are fitted in the housing 7, and the reference point is located in a defined and fixed positional relationship to the pressure sensor at the housing 7. The reference point can be a point of an outer housing surface 8, 8', 8", 8''', 8'''', 8''''' or be assigned thereto to a defined extent, wherein said outer housing surface serves, for example, as a supporting or alignment surface. If, for example, the reference point is assigned to an outer housing surface, the reference point is at a defined and fixed vertical distance (in relation to the outer housing surface) from the pressure sensor. The processor has a data connection to the pressure sensors 4, 4', so that on the basis of the hydrostatic pressures measured by the two pressure sensors it can determine a relative height h or distance in the direction in which gravity acts between a reference point that is assigned to the pressure sensor 4 at one end of the connecting hose 2 and a reference point that is assigned to the pressure sensor 4' at the other end opposite to the one end, as is shown by way of example in FIG. 3a. The determination of the relative height h or distance in the direction in which gravity acts is based here on the ascertainment of a difference between the two measured hydrostatic pressures. In order to obtain an accurate measured value for the relative height h it is crucial that the measured values of the two pressure sensors can each be assigned to a measurement time point. In this way measured values, or also interpolated measured values that can be assigned to the same measurement time point, can be used in order to determine the relative height h on that basis. The determination of the relative height h is also based on the defined, fixed positional relationship of the reference points to the two pressure sensors, and thus also to the vertical distance or distance in the direction in which gravity acts of the reference points to the respective pressure sensor.

In one advantageous variant, the device 1 has a temperature sensor at each end of the connecting hose. This temperature sensor serves for measuring the temperature, in particular in the liquid, at the respective pressure sensor. Since the relative height is determined on the basis of the difference between the measured hydrostatic pressures, and the hydrostatic pressure depends on the density of the liquid whose hydrostatic pressure is measured, a change in the density of the liquid affects the relative height that is determined. Such a change in the density can, for example, occur as a result of a change in the temperature of the liquid. By measuring the temperature at the two connecting hose ends, where in each case the hydrostatic pressure is measured, it is possible to take temperature influences on the density of the liquid into consideration in the determination of the relative height, for example through the use of density values of the liquid, stored in tabular form, at different temperatures, stored in the form of a "look-up table". By means of this look-up table, the effect of the temperature on the height measurement can be corrected. A temperature dependency of the pressure sensors themselves affecting the measurement of the pressure sensors can, for example, be determined by means of temperature sensors integrated into the pressure sensors, and the pressure measurement thus corrected automatically.

In one possible form of embodiment, the device 1 can comprise a synchronizer. This synchronizer serves the purpose of the temporally synchronized measurement of the hydrostatic pressures and/or also of the temperatures. This synchronizer has a logical clock that generates monotonically rising values on the basis of which the measurement at the pressure and/or temperature sensors is triggered or on the basis of which a measurement time point is assigned to the measured sensor values (hydrostatic pressures and/or temperature). The synchronizer can also comprise multiple logical clocks, for example one for each sensor, wherein the multiple logical clocks are then synchronized to one another, and wherein then, on the basis of the synchronized, monotonically rising values of the multiple clocks, the sensor measurements are triggered, or wherein then on the basis of the synchronized monotonically rising values of the multiple logical clocks, a measurement time point is assigned to the measured sensor values (hydrostatic pressures and/or temperature). Temporally synchronized measured sensor values, or sensor values assigned to a common measurement time point (including interpolated sensor values), in particular those whose curve over an interval of time can be used by the processor to identify disturbing factors such as, for example, fluctuations in the sensor values, that influence the determination of the relative height, so that these disturbing factors are not considered in the determination of the relative height, or are "filtered out". External influences such as the connecting hose being squashed or swung can be significantly reduced through a synchronized measurement of pressure at the two hose ends. A further measure for reducing the disturbing oscillations of the connecting hose is the distributed placement of mechanical damping filters in the liquid, wherein the damping filters are mounted in the hose and/or close to the hose ends. Fins, membranes or sponge-like foam materials have a filtering effect. These aids reduce the variations in the hydrostatic pressure amplitudes of the liquid.

Figure 10:
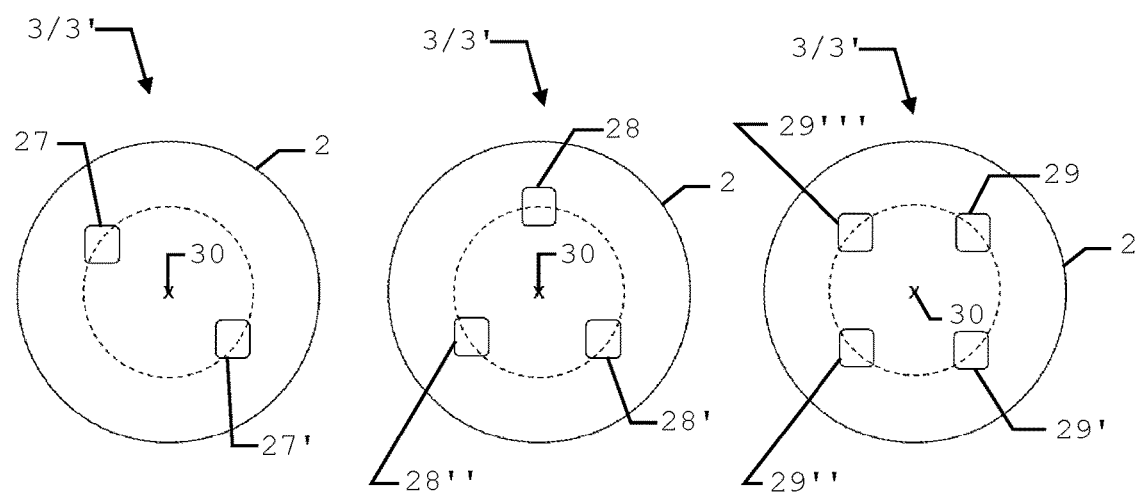

In one advantageous form of embodiment, the device 1 can comprise multiple pressure sensors 27, 27', 28, 28', 28", 29, 29', 29", 29''' at each end of the connecting hose for measuring the hydrostatic pressure. These pressure sensors can here have a fixed positional relationship to one another, and be arranged, for example, around the centre point 30 of the annular connecting hose cross-section at the ends of the connecting hose, as shown by way of example in FIG. 10.

The hydrostatic pressures measured by the multiple pressure sensors at one end of the connecting hose can then be averaged and then included as a mean value in the determination of the relative height. The accuracy of the measurement can thereby be improved both statistically and absolutely. These multiple pressure sensors can in addition also be arranged in such a way that they can be configured as a redundant sensor system, and thus contribute to increasing the security against failure and security of function and operation of the device. The pressure sensors that are arranged at the respective end of the connecting hose around a common centre point can, furthermore, make it possible to deduce an orientation of this end in relation to a reference point on the basis of the hydrostatic pressure differences determined between the pressure sensors that are arranged at the same end of the connecting hose. This is made possible if, as a result of the orientation of the connecting hose end, and as a result of the defined arrangement of the pressure sensors at this end, a height difference in the direction in which gravity acts between the pressure sensors that can be assigned to a specific orientation results. The information determined in this way regarding the orientation of the two ends of the connecting hose can then be used by the processor in order to determine the relative height between the two reference points. If multiple reference points are assigned to the ends of the connecting hose or their sensors, the information on the orientation of the two ends of the connecting hose can be used by the processor to determine the two reference points out of a group of possible reference point pairs between which the relative height is determined.

The determination of the relative height by the processor takes place on the basis of a measured hydrostatic pressure difference between the two ends of the connecting hose. The processor can, for example, determine the relative height between two reference points by reading from a stored correlation table that assigns hydrostatic pressure differences to the particular relative heights. The correlation table is here based on a calibration relationship. It would equally be conceivable for the measured pressure difference to be assigned to a relative height by means of a calibration relationship. The calibration relationship establishes a device-specific and orientation-specific relationship between measured pressure differences and relative heights. The calibration relationship can, for example, be a mathematical function that calculates the relative height as a function of the measured pressure difference.

The device advantageously comprises further temperature sensors that can be arranged at or in the connecting hose. These temperature sensors have the purpose of measuring the temperature of the liquid not only in the region of the pressure sensors but over a full range of the liquid. A plurality of temperature sensors can be arranged for this purpose in a distributed manner over the length of the connecting hose in such a way that they measure the temperature of the liquid in a distributed manner over the range of the connecting hose. As a result, local thermal influences on the liquid, for example a local source of heat that is sufficiently far from both ends of the connecting hose that the temperature sensors at the pressure sensors cannot detect it in the form of a temperature change of the liquid, can also be taken into account in the determination of the relative height.

Figure 14:
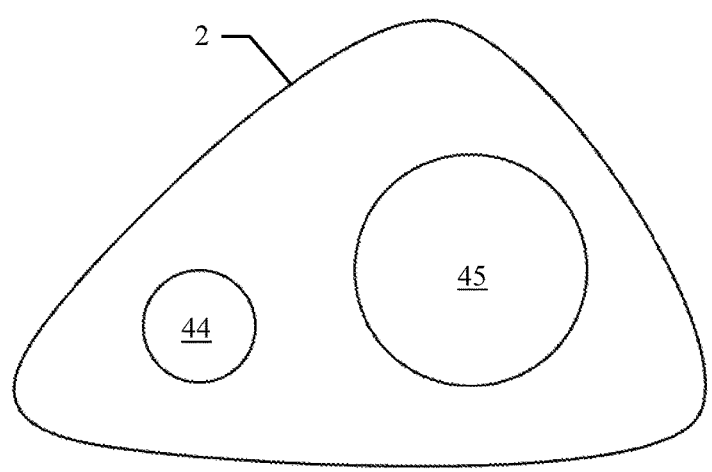

In relation to the same problem with respect to local thermal influences on the liquid, the connecting hose can comprise two hose compartments (44, 45), as is illustrated schematically in a cross-section of the connecting hose in FIG. 14. The two hose compartments are here separate from one another and arranged lying adjacent to one another in such a way that an exchange of heat takes place between the media in the hose compartments. The one hose compartment (44) is filled with the liquid that connects the pressure sensors, and the other hose compartment (45) provides a region or a volume for the circulation of a further medium, for example a flow of air or gas or a cooling liquid. A flow of air could, for example, be provided by possible cooling fans of the hardware at the ends of the hose. As a result of the exchange of heat between the media in the hose compartments, local thermal effects on the liquid that connects the pressure sensors, from a local heat source for example, are minimized. The exchange of heat with a circulating medium here achieves a temperature-stabilizing effect on the liquid that connects the pressure sensors. The diameter of the hose compartment that is filled with the liquid that connects the pressure sensors has, ideally, a value smaller than the other hose compartment, as shown by way of example in FIG. 14. The smaller diameter can, for example, be 2.5 to 3 mm, and the larger diameter around 7 mm.

The correct choice of colour for the connecting hose can also have a temperature-stabilizing effect. Yellow or white connecting hoses, for example, show a temperature-stabilizing effect acting on the liquid that connects the pressure sensors.

The processor can advantageously have a calibration functionality. The calibration functionality here enables an easy (re-)calibration of the device at any time. The calibration relationship is determined during the (re-)calibration. The determination of the calibration relationship is based here on the positioning of the two ends of the connecting hose with respect to one another at a defined spacing in the direction in which gravity acts. This defined relative height can be assigned to the measured pressure difference. On the basis of at least one such assignment of a pressure difference to a defined relative height, the calibration relationship can then be determined by the processor.

Figure 2:
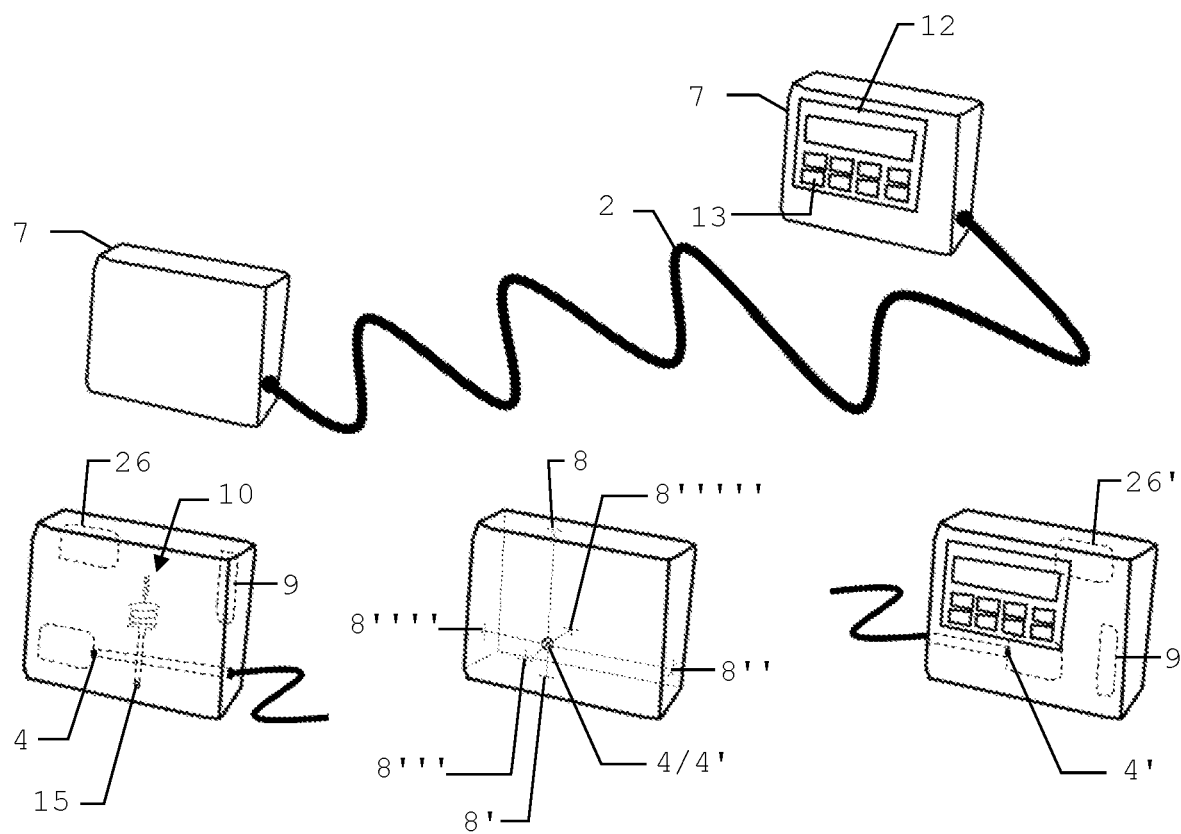

According to a further possible form of embodiment of the device 1, as already shown in FIG. 2, multiple reference points 8, 8', 8", 8''', 8"", 8''''' with a fixed positional relationship can be assigned to one pressure sensor. This can, for example, be realized in that a housing 7 fixes the positional relationship of a plurality of reference points to the respective pressure sensor. Ideally then the connecting hose end and the pressure sensor are fitted in the housing, and the reference points are located in a defined and fixed positional relationship to the pressure sensor at the housing. Each reference point can here be a point of an outer housing surface or be assigned thereto to a defined extent, wherein the respective housing surface serves, for example, as a support surface. Thus in the case of a cubic housing, each of the six main housing surfaces could have a reference point 8, 8', 8", 8''', 8"", 8'''''. On the basis of the hydrostatic pressures measured by the two pressure sensors, the processor then determines a relative height or distance in the direction in which gravity acts between one of the reference points that is assigned to the pressure sensor at one end of the connecting hose and one of the reference points assigned to the pressure sensor at the other end that is opposite the one end. The determination of the relative height or distance in the direction in which gravity acts is here based on the determination of a difference between the two measured hydrostatic pressures, on the defined, fixed positional relationship of the reference points to the two pressure sensors, and thus also on the vertical distance or the distance in the direction in which gravity acts of the reference points from the respective pressure sensor.

In an advantageous form of embodiment of the device 1, it can comprise an orientation measuring module 9 at each end of the connecting hose. In the simplest case, the orientation measuring module 9 can comprise an acceleration/inclination sensor. The orientation measuring module is advantageously a 3D orientation measuring module, and here comprises at least three acceleration sensors that measure an acceleration in three mutually perpendicular directions. On the basis of these measured accelerations, an inclination of the corresponding connecting hose end relative to the direction in which gravity acts can be determined, in particular automatically. The orientation of a pressure sensor determined on this basis then relates to the spatial orientation of the pressure sensor relative to a reference point. On the basis of the orientation of the connecting hose ends determined in this way, two reference points can automatically be determined by the processor, between which the relative height h is determined, as shown by way of example in FIG. 3a.

Figure 7A:
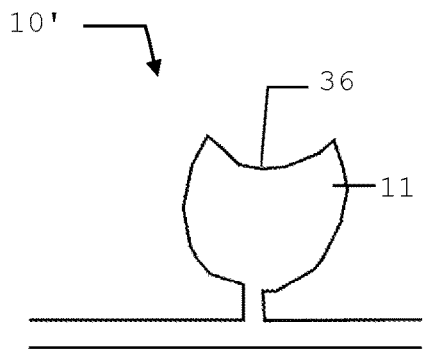
FIGS. 7a, b show possible forms of embodiment of pressure compensation vessels.
Figure 7B:
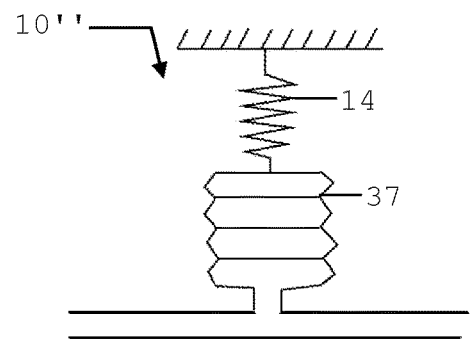

In one form of embodiment of the device 1, it can comprise a pressure compensation vessel 10 at one end of the connecting hose, as shown schematically in FIG. 2. This pressure compensation vessel controls the establishment and maintenance of a base pressure of the liquid in the connecting hose. The establishment of this base pressure fulfils an important task during, for example, the calibration or recalibration of the device, and allows the hydrostatic pressures that occur to be adapted to the sensitive range of the two pressure sensors. The pressure compensation vessel also makes it possible to limit a positive or negative pressure in the connecting hose with respect to an external atmospheric air pressure. As a result the device can be protected against possible damage to, for example, the sensors, the connecting hose etc. In addition, it makes an ingress of air resulting from possible leaky locations in the hydrostatic system unlikely, since the internal hydrostatic pressure is continuously adjusted to the external pressure, this being done at least at one end of the connecting hose. Schematic illustrations of possible forms of embodiment 10', 10" of such pressure compensation vessels are shown in FIGS. 7a and 7b. The purely exemplary device in FIG. 7a comprises a reservoir 11 filled with the liquid of the connecting hose, with a pressure compensation membrane 36. This device is appropriate for equalizing the hydrostatic pressure in the connecting hose to the external atmospheric air pressure. The exemplary device, as shown schematically in FIG. 7b, has a bellows 37 and a spring body 14 for establishing the positive or negative pressure of the hydrostatic pressure in the connecting hose. The one end of the spring body is connected to the bellows, and the other end of the spring body is connected, for example, to the rigid housing. One end of the connecting hose can also comprise a bleed valve 15. This bleed valve makes it possible to eliminate air trapped in the connecting hose. The accuracy of measurement can be maintained in this way and, in the event that air does penetrate into the connecting hose, this should be removed again in the course of a new calibration.

Figures 3A, 3B, 3C:
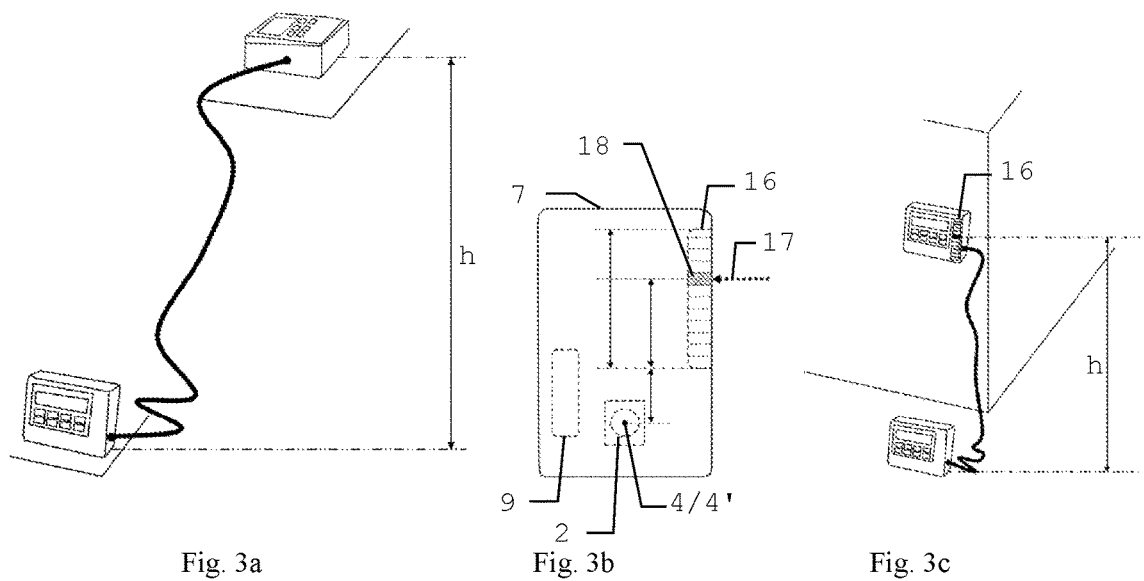
FIGS. 3a, b, c show further forms of embodiment of the device with multiple reference points assigned to the pressure sensors and an OAD.
Figure 6:
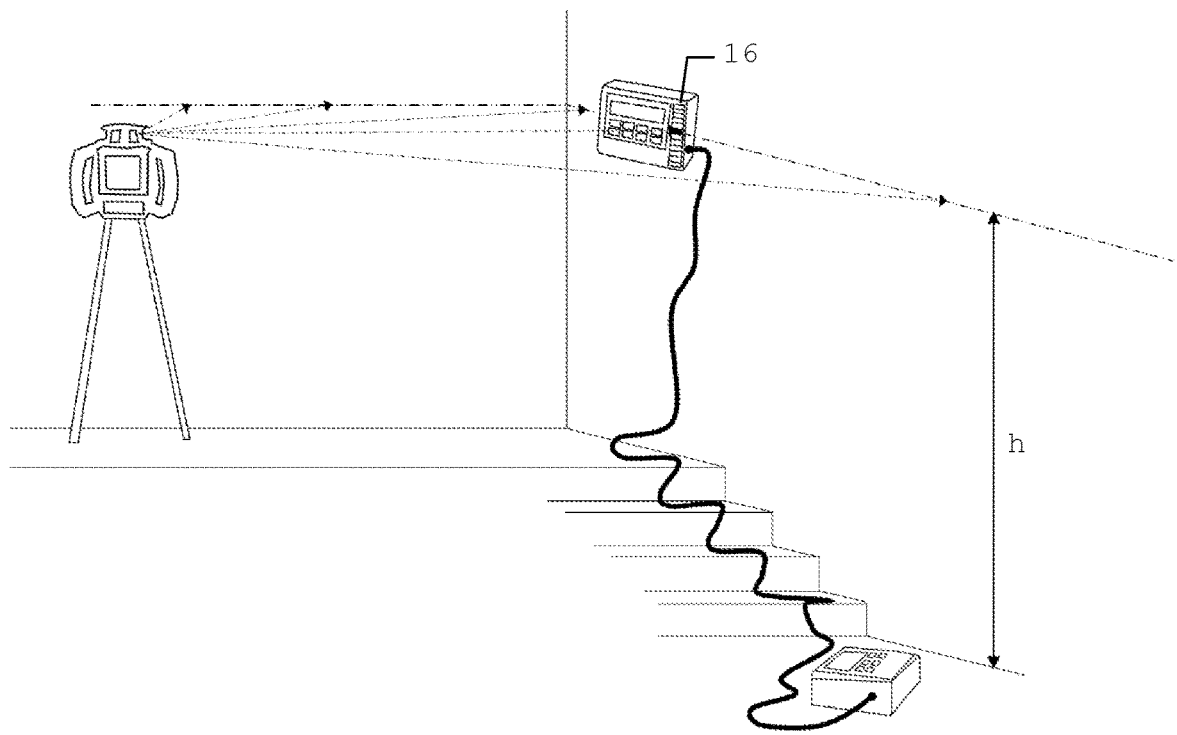

In a further specific form of embodiment, the device 1 can comprise an optical, position-resolving detector 16 (OAD) at one end of the connecting hose, as shown by way of example in FIG. 3b. Possible optical and position-resolving detectors can, for example, be resistive, position-sensitive semiconductor diodes with a high measuring speed (PSD=position sensitive detector). Detectors with discrete location resolution can be pixel-based detectors based on flat or linear sensors (line sensors, diode arrays), charge-coupled devices (CCD), or CMOS cameras. The optical OAD 16 here is attached to the end of the connecting hose in such a way that it has a fixed positional relationship to the corresponding pressure sensor 4/4'. The optical OAD 16 has a data connection to the processor, and is configured to detect optical radiation 17 in a position-sensitive manner. This means that the position 18 at which optical radiation is detected by the OAD is detected can be determined in relation to the detector whose position has a fixed definition. Since the OAD has a fixed and defined positional relationship to the corresponding pressure sensor, the position 18 at which optical radiation is detected by the OAD is also determined in relation to the position of the pressure sensor. The position at which the OAD detects optical radiation can also be understood as a region in which optical radiation is detected. This region then has a corresponding plurality of positions at which optical radiation is detected. On the basis of the position 18 at which the optical radiation is detected by the OAD, or on the basis of the region in which optical radiation is detected, an OAD point, for example the focus point of a laser beam from a pipe laser, can be determined, wherein a distance in the direction in which gravity acts between the pressure sensor and the OAD point can be determined as the OAD height. It is thus possible for the processor to define the OAD point as the reference point and on that basis, or on the basis of the OAD height, to determine the relative height h from a different reference point that is assigned to the pressure sensor at the other end of the connecting hose, as shown by way of example in FIG. 3c. The optical radiation that is determined by the OAD can, for example, be reference radiation that is transmitted from a rotary laser in order to mark a reference height. On the basis of the reference height defined in this way, a relative height to a further reference point can be determined, as shown by way of example in FIG. 6.

Figure 8:
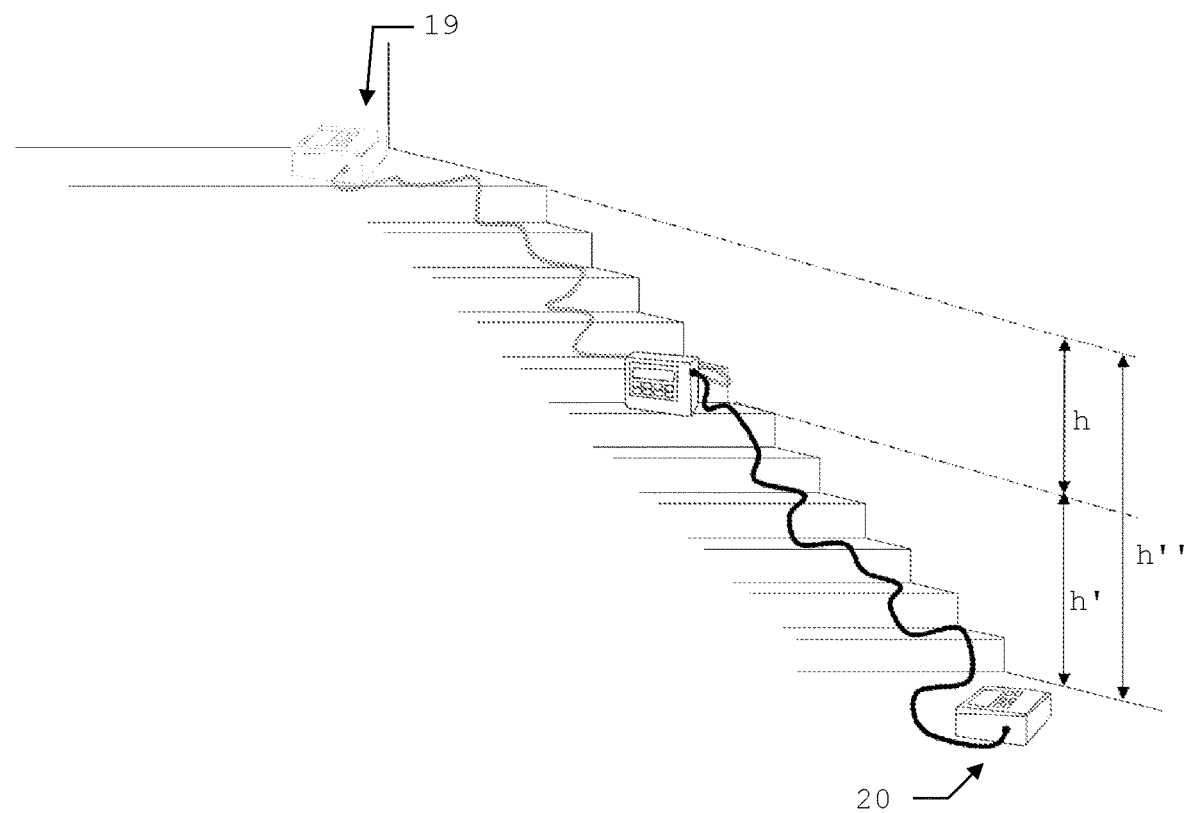

According to a further form of embodiment of the device 1, it can comprise a display 12 and/or an input keyboard with operating fields 13 at one or at both ends of the connecting hose. The display and/or the input keyboard comprise a data connection to the processor. Information relating to the measured sensor values, and thereby also concerning the relative height h that is determined, can be displayed via the display. Such information can, for example, be the measured temperature or also the measured pressures. Information that allows the reference points currently in use, on the basis of which the relative height h is determined, to be deduced could also be displayed. The display can also be a touchscreen, and serve for the input of commands from a user. The display can, for example, comprise different operating fields 13 for navigation in a multi-level "menu structure". The operating fields 13 can, for example, relate to the measuring mode, enable system information to be queried, or also open a submenu for sensor calibration. A status relating to the measurement or to calibration can, furthermore, be output via the display, indicating the progress of the measurement or of the calibration. The operating fields 13 can also serve for the input of direct commands/instructions to the processor. These operating fields 13 can also be arranged in the form of push-buttons at the respective hose end. Such instructions can, for example, relate to setting a zero point. By means, for example, of actuating the corresponding operating field, the position of the one end of the connecting hose can here be defined as the zero point from which the relative height to a reference point that is assigned to the pressure sensor at the other end of the connecting hose is determined; a further instruction could relate to the selection of a measuring mode in which the position of the one end of the connecting hose is defined as the zero point from which the relative height to a reference point that is assigned to the pressure sensor at the other end of the connecting hose is determined, wherein the other end of the connecting hose is positioned in sequence at a first 19 and second 20 position and then, on the basis of the first and second relative heights h, h' determined in that way, a relative total height h" is determined, as shown in FIG. 8. Further instructions could, for example, relate to the storage of a sensor measured value or of a particular relative height h, or the preparation of a notification regarding a determined relative height h. An instruction could, equally, have the result that sensor values, or particular relative heights h, are stored when the sensors output measured values over a defined period of time that are within a specified tolerance bandwidth. Settling processes can in this way be filtered out automatically. Reaching stationary measurement states as a predefined criterion can then, for example, be indicated through the output of an in particular acoustic signal via the signal transducer. Varying measured values related to the relative height that is to be determined are mainly generated by an oscillation in the connecting hose. They then vary periodically with falling error amplitude. If the positioning of the connecting hose is unfavourable, as much as 10 seconds can go by before a stationary measurement state is achieved allowing for an accurate reading of the height. This settling time can be greatly shortened with simple algorithms, for example by means of a determination of the period length and a sliding mean value taken over an integral multiple of a period duration. An accurate relative height can be determined in this way after only a few seconds. The display 12 described, or the touchscreen described, can also be part of a mobile terminal or computer. The mobile terminal, or the mobile computer, does not have to be arranged here at the device, but can be used when separated from it. The two connecting hose ends can equally comprise a device/bracket that serves to fasten the mobile terminal or the mobile computer to the connecting hose ends in a removable manner. The mobile terminal, or the mobile computer, then comprises a data connection (for example wired or wireless via radio, Bluetooth, Wi-Fi) to the processor of the device. So that both ends of the connecting hose can easily be carried by hand, it appears highly advantageous that the mobile computer, in particular the tablet or mobile phone, can be fixed to the one end of the connecting hose, for example using a robust support bracket as a snap-on device. In addition to being networked to other terminals, to the Internet or to cloud computing systems, tablets or smartphones as mobile terminals have the advantage of a large display, an integrated keyboard and a high-resolution camera. These aids simplify the operation and the workflow with the assistance of suitable, supporting applications. In addition, attributes such as photographs and/or GPS coordinates can be stored in association with the surveyed or measured data. Graphical information can, moreover, be provided on the display, such as the display of a spirit level in order to visually indicate the alignment of the reference point to the vertical direction, or to display a site plan with the measurement points or measurement heights that are to be surveyed or monitored.

Figures 4A, 4B:
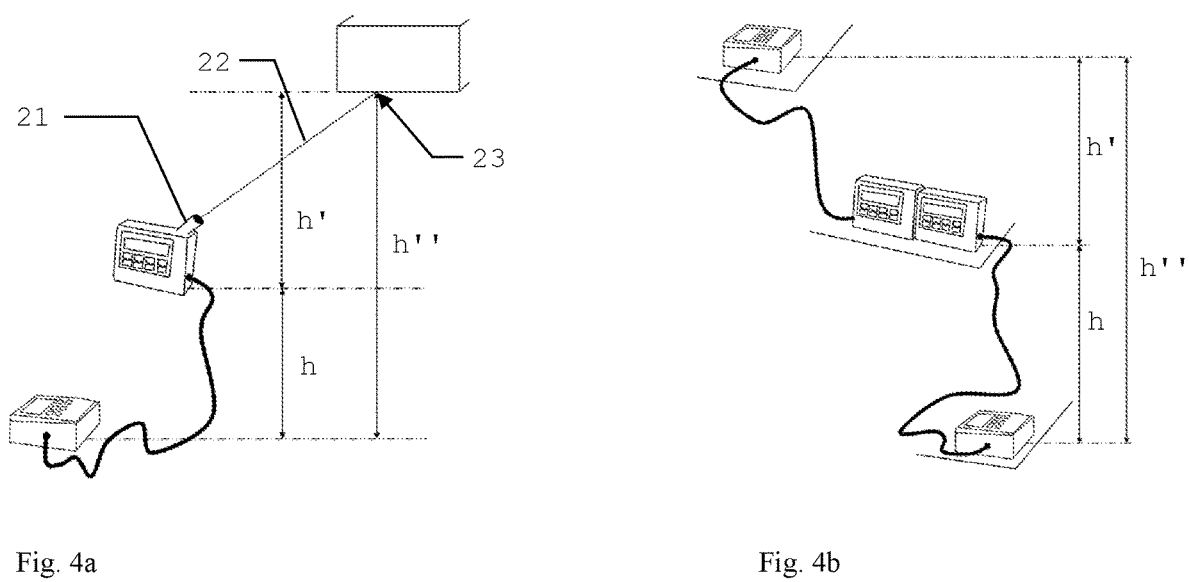
FIGS. 4a, b show further forms of embodiment of the device with an optical distance measuring device and coupled to a further device.

As shown by way of example in FIG. 4a, in one specific form of embodiment, one end of the connecting hose can comprise an optical distance measuring device 21 with an inclination sensor. This optical distance measuring device 21 is arranged at one end of the connecting hose in such a way that it has a fixed, defined positional and orientational relationship to the corresponding pressure sensor, and comprises a data connection to the processor. Such an optical distance measuring device 21 measures absolute distances to a targeted point/destination point 23 by means of optical distance measuring radiation 22, and can, for example, be a laser distance measuring system for the measurement of absolute distances by means of laser radiation. The processor can then determine the inclination of the distance measuring radiation by means of the inclination sensor. Through the fixed, defined position and orientation of the optical distance measuring device 21, it is possible, on the basis of the inclination measured by means of the inclination sensor and of the distance measured to a targeted point 23, to determine the relative height h' between the pressure sensor and the targeted point. The optically measured distance/inclined distance is converted by means of the electronic orientation or inclination sensor into a height difference parallel to the vertical direction. The electronic orientation or inclination sensor can here be provided by the corresponding connecting hose end or by the optical distance measuring device itself. On the basis of the relative height h' determined in this way and of the relative height h determined, a relative height h" between a reference point that is assigned to the pressure sensor at the other end of the connecting hose and the point 23 targeted and measured by the optical distance measuring device can be determined with the device. The inclination sensor can also be an acceleration sensor of an orientation measuring module 9.

Figure 5:
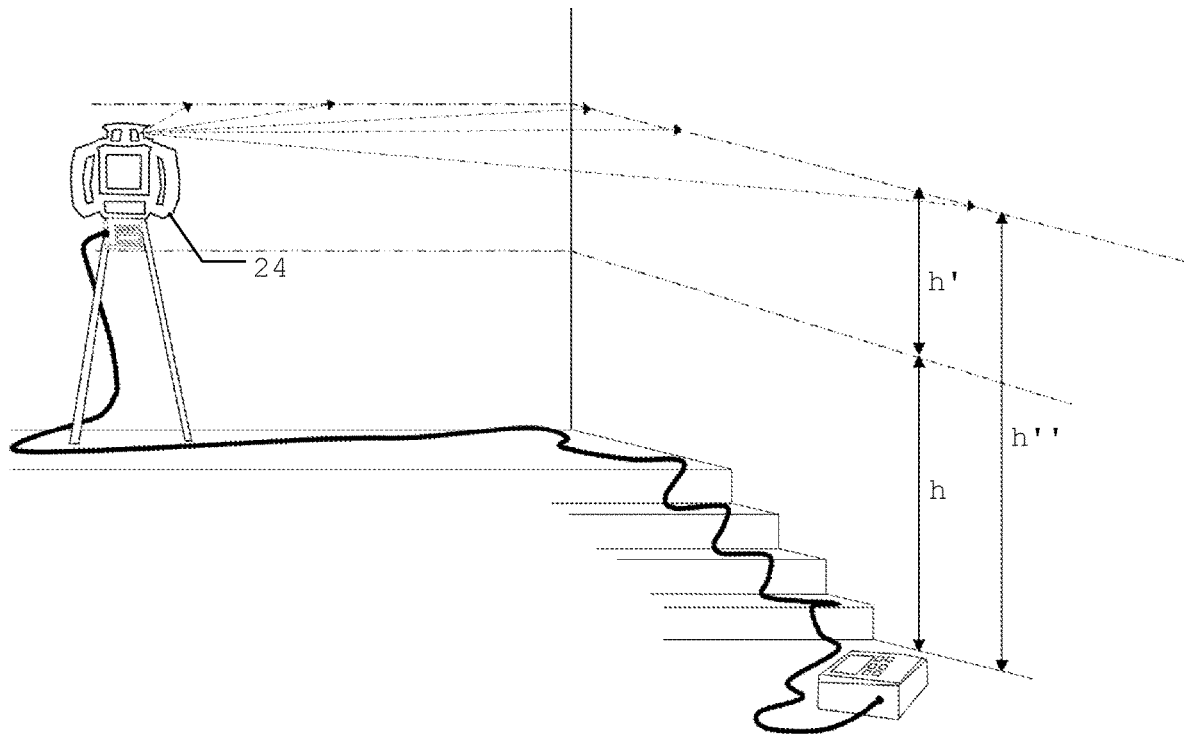

As shown by way of example in FIG. 4b, in one further specific form of embodiment the device 1 can comprise a coupling device at one end or also at both ends. This coupling device is here designed for coupling and decoupling further measuring devices at the respective connecting hose end of the device 1. Further measuring devices can, for example, be optical distance measuring devices, laser trackers, laser scanners, total stations, theodolites or levelling devices in general, or may also be measuring gauges that embody a defined measure of length, or also devices 1 as described here for the determination of relative heights h. The coupling device here comprises a data connection to the processor of the device 1 (wired or wireless), so that this recognizes a coupled or decoupled state and signals this state as the coupling status to the processor. This recognition of the coupling status can, for example, be enabled through a simple, electrical, magnetic or optical contact. The device then additionally comprises an electronic identification mark at least one end of the connecting hose. This electronic identification mark can be a radio-frequency identification (RFID) "tag" or any other desired "tag" that can be used in accordance with the near field communication (NFC) transmission standard. The device furthermore comprises a reading device that can recognize electronic identification marks and evaluate/read them out. This reading device for electronic identification marks comprises a data connection to the processor of the device (wired or wireless), so that the reading device signals a recognition of an electronic identification mark to the processor and also transmits the information that has been read to the processor. The processor is then configured such that it determines a relative height h, h', h" on the basis of the coupling status and on the basis of the information exchange between the processor and the reading device. A connecting hose end of the device can, for example, be coupled in this way to a housing side of an erected rotary laser 24, as shown by way of example in FIG. 5. The coupled status is recognized as such by the coupling device, and signalled to the processor of the device 1. At the same time, the reading device recognizes the electronic identification mark of the rotary laser, signals this to the processor, and also transmits the information associated with the identification mark to the processor. The processor then knows the coupled state and, on the basis of the information that is associated with the electronic identification mark, identifies a rotary laser 24 as the coupled measuring device. On the basis of this information, the device then determines a relative height h between a reference point of the device 1 and a reference point that is assigned to the coupled rotary laser 24. Information relating to the reference point that is assigned to the rotary laser 24 is stored, on the basis of the defined, fixed positional relationship of precisely this reference point to the coupling device of the rotary laser, in a storage medium of the hardware of the device, from where it can be called by the processor. A further example would be the coupling together of two identical devices 1 as are described here for the determination of relative heights h, h', h" between two points, as shown in FIG. 4b. As a result of the coupling together, the processor, analogously to the previous example, would identify the coupled measuring device as the device for determining relative heights and, on that basis, additionally determine a relative height h" between a reference point that is assigned to the pressure sensor at the one connecting hose end that is not coupled (coupling status is decoupled) of the one device and a reference point that is assigned to the pressure sensor at the one connecting hose end that is not coupled (coupling status is decoupled) of the other/coupled device.

Figure 9:
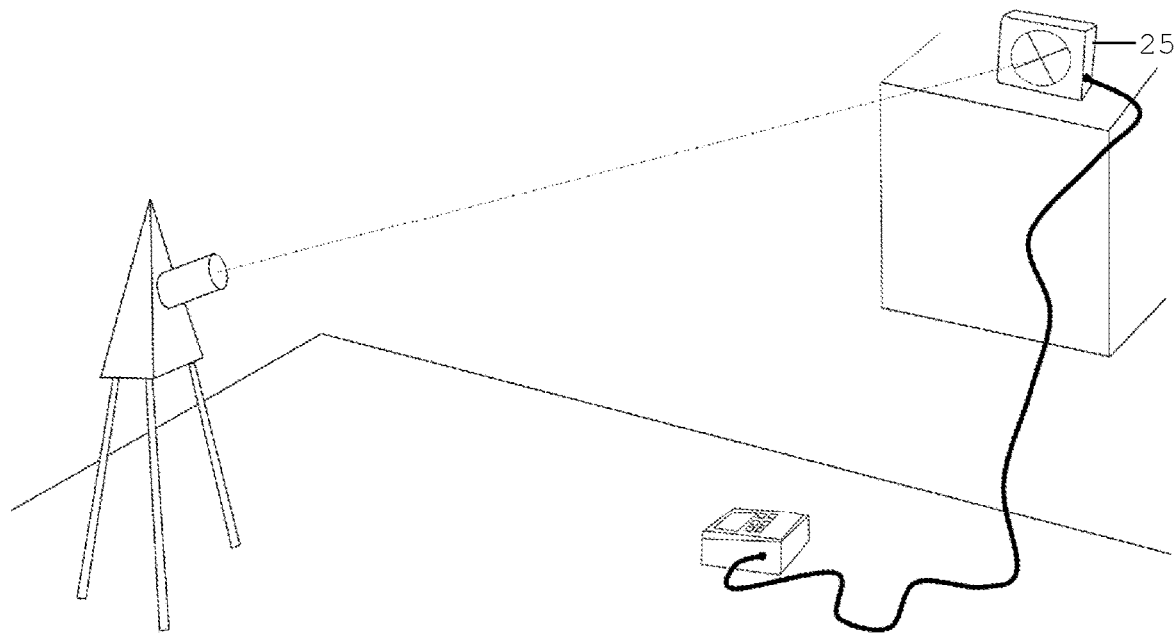

According to a further form of embodiment, as shown by way of example in FIG. 9, the device can comprise a reflector 25 with a reference point at one end of the connecting hose. This reflector 25 here has a fixed and defined positional relationship to the pressure sensor. The reflector can be a prism-based retroreflector, a concave reflector, a 360 degree reflector or a target mark. The reflector is designed to reflect optical reference or measurement radiation from an optical surveying device in such a way that the surveying device can calibrate the reflector and thus the end of connecting hose. A total station, a theodolite or a tachymeter are exemplary optical surveying devices. By means of an automatic targeting and/or target tracking unit such a surveying device continuously targets the centre of the reflector, and thereby acquires the position coordinate data of the reflector at the end of the connecting hose. Because of the fixed and defined positional relationship of the reflector to the pressure sensor, the device can determine a relative height on the basis of the height of the reflector calibrated by the surveying device between the reference point of the reflector and a reference point assigned to the other pressure sensor.

Figure 11:
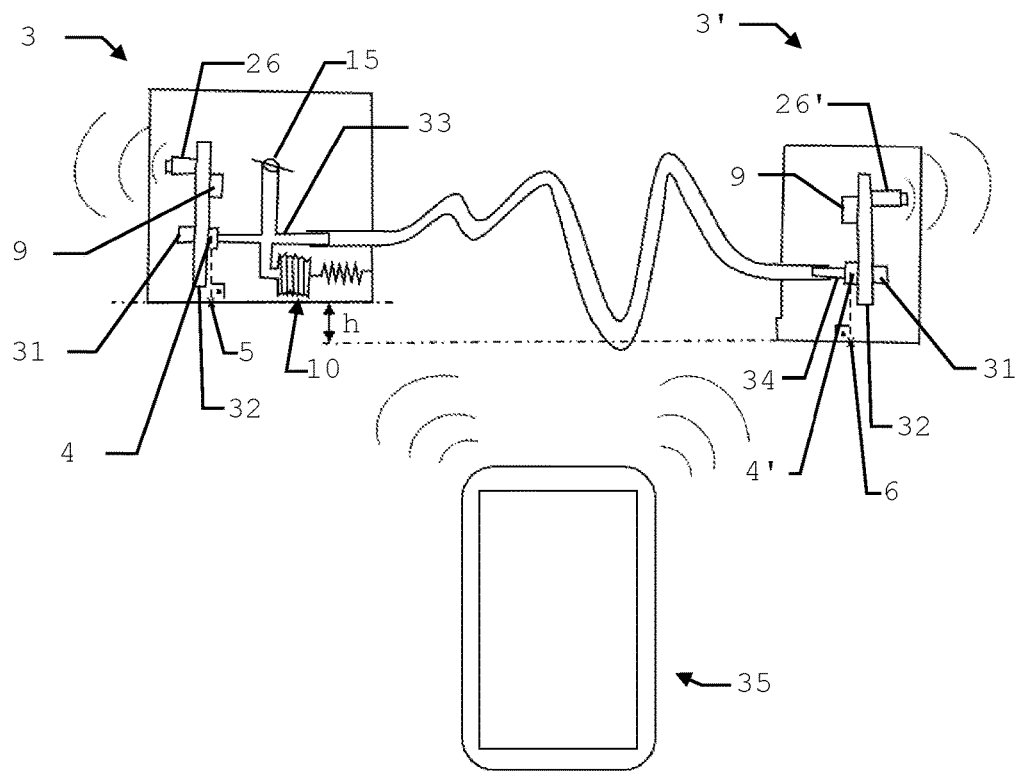

FIG. 11 shows the device according to a further form of embodiment. A respective electronic board (32) that comprises a wireless module (26, 26'), an orientation measuring module (9), a temperature sensor (31) and a pressure sensor is located at both hose ends 3, 3'. The two ends 3, 3' are connected to one another mechanically by a first connecting piece (33) at the one end of the connecting hose and a second connecting piece (34) at the other end of the connecting hose. The two ends 3, 3' are, furthermore, electronically connected in real time via a data connection in order to ensure an accurate temporal synchronization of the respective pressure and temperature measurements in the two end devices 3 and 3'. The first connecting piece (33), the connecting hose 2, the pressure sensor, a pressure compensation vessel (10) and a bleed valve (15) are rigidly connected to one another in the interior of a first housing 7, and the second connecting piece (34), the connecting hose 2 and the pressure sensor are rigidly connected to one another in the interior of a second housing 7. The inventive device can furthermore be remotely operated wirelessly from a tablet computer or a smartphone (35). The data connection to the device takes place in each case via the wireless modules (26, 26'). The tablet computer or the smartphone (35) can here be carried by hand or plugged in at one of the housings 7.

According to a further specific form of embodiment of the device, the one end of the connecting hose can be firmly attached at the connecting hose receptacle of a hose winding device, wherein said connecting hose receptacle is mounted such that it can rotate about an axis of rotation. The connecting hose can then be wound with the other free end onto the connecting hose receptacle of the hose winding device, and unwound from it again. This in particular permits the use of long connecting hoses while at the same time the device has a compact structure. The compact construction of the connecting hose ends is then advantageous, since this enables the attachment of a connecting hose end to a rotatable connecting hose receptacle.

Figure 12:
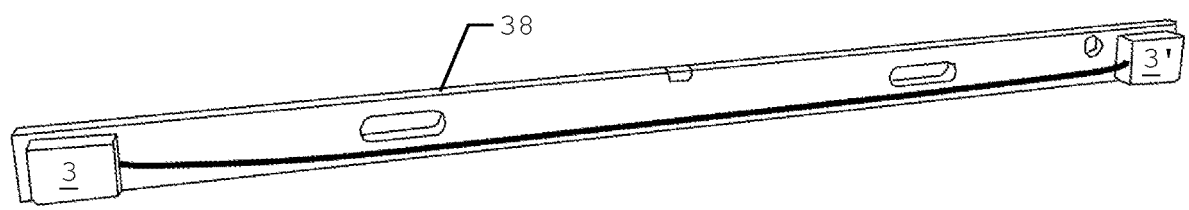

According to a further form of embodiment, as shown by way of example in FIG. 12, the ends of the connecting hose 3, 3' are connected to one another rigidly with a defined spacing and specific positional relationship to one another, for example through attachment to a rigid batten, wherein the one end of the connecting hose 3 is fixed close to the one end of the batten and the other end of the connecting hose 3' is fixed close to the other end of the batten. On the basis of the measured hydrostatic pressures at the ends of the connecting hose, the relative height between a reference point assigned to the one end of the connecting hose and a reference point assigned to the other end of the connecting hose can be determined. On the basis of the fixed, known distance between the two reference points, an inclination of the rigid batten can then be ascertained by means of the determined relative height. In one simple possible form of embodiment, such a device can also merely be configured to identify and indicate an equal height of the two ends of the connecting hose, or to signal it, for example in the manner of a digital spirit level or builder's level. The processor can further be configured to display the inclination value it has determined via the display and/or a tablet computer or a smartphone. Such a device can then have a double function as a levelling gauge or builder's gauge and as an inclinometer. Inclinometers are used, inter alia, in construction in wet areas when laying pipes or during ground work with grass verges, access roads, forecourts, where a specific gradient is to be realized.

Figure 13:
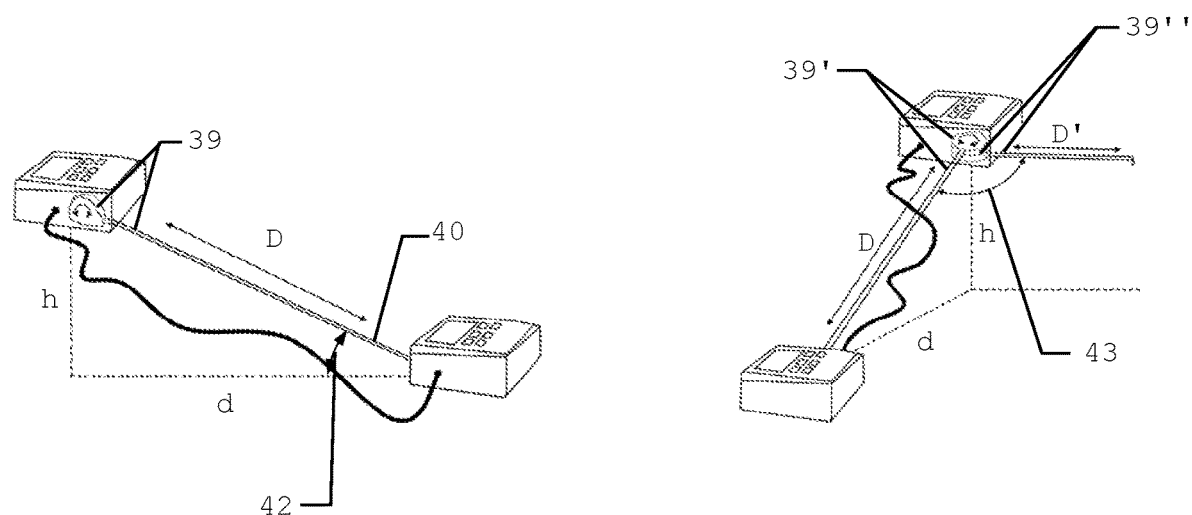

According to one specific form of embodiment, the device can also be designed to use a specific relative height h in order, for example, to measure and/or survey terrain profiles. For this purpose the device can comprise an extensible electronic measuring tape with a distance transducer at one end of the connecting hose, as is shown by way of example in FIG. 13 (39). The measuring tape 40 itself can, for example, be a cord, a lanyard, a tape or a chain, and is retractably attached in a housing, wound up into a roll. The distance transducer is configured to determine a distance D between a reference point of the one end of the connecting hose and the end of the measuring tape that has been pulled out/unrolled out of the housing, depending on the extent to which the measuring tape has been pulled out or unrolled. The distance transducer can, for example, be an optical sensor unit that reads optically a scale or embossing present on the measuring tape. Equally, an optical sensor unit can, for example, use a distance measuring beam in order to record the changing radius/diameter of the roll of measuring tape that depends on the degree to which it has been pulled out or unrolled, wherein the distance is determined on that basis. The distance transducer can also be an electromechanical sensor unit which determines a corresponding distance, for example on the basis of the rotary movement of a roller located at the measuring tape, or on the basis of the rotary movement of the roller onto which the measuring tape is rolled. The electronic measuring tape has two ends, wherein the one end is firmly attached inside the housing, and the other can be pulled out. The extensible end can advantageously be attached to the other end, opposite to the one end, of the connecting hose. In this way it is possible with the device to determine automatically a horizontal distance d between the two connecting hose ends. A gradient or inclination angle 42 can equally be ascertained automatically on the basis of the distance D that has been surveyed and the relative height h that has been determined.

In a further advantageous form of embodiment, the device can also be designed to survey or to measure 3D points, for example on a terrain surface. For this purpose the device can comprise two extensible electronic measuring tapes 39', 39" at one end of the connecting hose. Each measuring tape is here rolled up into a roll retractably in its own housing, wherein the two housings are connected together to form a unit by way of a common axis of rotation, and wherein this unit comprises an angle transducer. The angle transducer is configured for this purpose to determine a measured angular value for an angle 43 which is enclosed by the two suitably extended/unrolled measuring tapes D, D'. The angle transducer here determines the measured angular value on the basis of the rotary movement executed about the common axis of rotation of the two housings relative to one another.

Second Aspects

The inclination sensor according to second aspects can be used to determine the inclination of objects that are in some form of relationship to the inclination sensor, about one or more axes with respect to the vertical direction defined by the gravitational field. The inclination sensor is advantageously small in size, so that it can be integrated in any device, for example surveying devices or objects that must either be aligned with respect to the direction of the vertical or require information about their alignment. The functioning of the inclination sensor is based on the principle of determining relative heights between two points spaced a defined distance apart by measuring hydrostatic pressure differences between the points. Based on the determined relative height and the defined distance between the two points, an associated angle of inclination can be calculated. Components of an inclination sensor according to second aspects are shown purely as an example in FIG. 15. Here the inclination sensor 1 has a fluid container 3 (shown purely as an example), which is filled with a fluid or connecting fluid 4. The fluid container material has a high chemical resistance and, in particular, good compatibility with the connecting fluid with which the fluid container 3 is filled. The fluid container material also forms a sufficiently efficient diffusion barrier for gaseous substances, in particular moisture, oxygen, $CO_2$ and nitrogen. For example, the fluid container 3 can be made of a polymer which has a sufficiently high rigidity for the application and with due consideration to the corresponding fluid container geometry, so that elastic deformations of the fluid container material during operation are sufficiently small and the settling time to obtain the relative height measurement is therefore short. The same applies in an analogous way to the temperature stability of the fluid container material. The fluid container is completely filled with the connecting fluid so that no trapped air pockets are present. The choice of fluid is matched to the material properties of the fluid container material and, in particular, should have a freezing point below $-40°$ C. Various oils are suitable for this purpose, such as silicone oil, transformer oil, mineral oil, an ethylene glycol-water mixture, weak acids, alcohols and other organic fluids.

Figure 15:
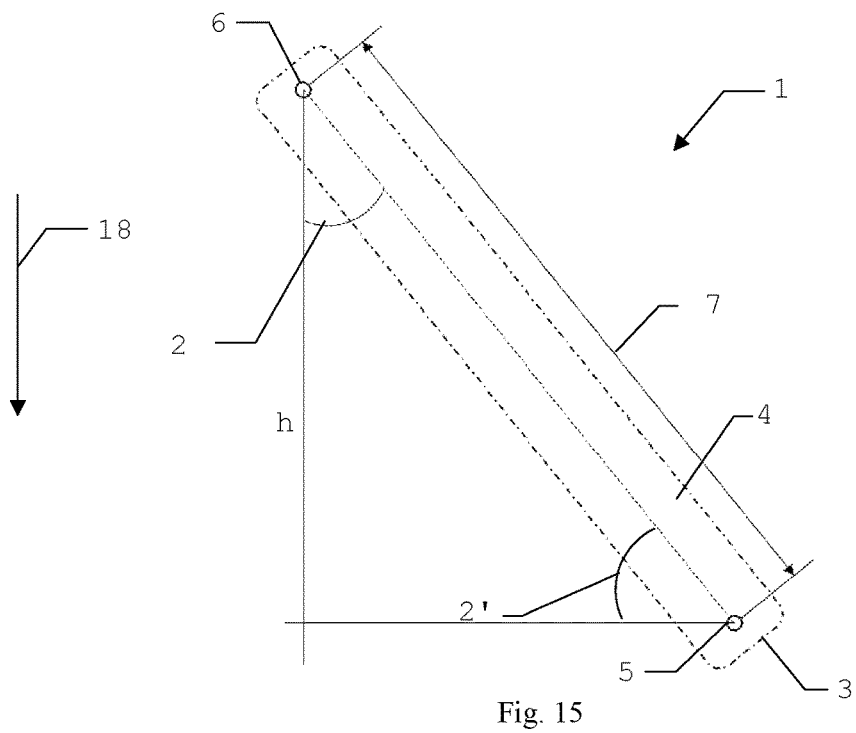
FIGS. 15 to 18 relate to the second aspects. In detail.

As shown in the example in FIG. 15, a first 5 and a second pressure sensor 6 are arranged opposite each other with respect to the fluid container centre in the edge region of the container, in such a way that they are connected to each other via the connecting fluid. The first pressure sensor 5 and the second pressure sensor 6 can also consist of a plurality of individual pressure sensors in order to average the measured values and thus reduce the noise. The pressure sensors have a fixed and defined positional relationship to each other and are thus a fixed and defined distance 7 apart. The pressure sensors are designed to measure a hydrostatic pressure in the connecting fluid. The pressure sensors can also be part of a pressure sensor module which is integrated in the fluid container wall. This arrangement of the sensors allows the hydrostatic pressure to be measured in the same fluid at the two opposite peripheral regions of the fluid container, in particular at the same time.

The inclination sensor according to second aspects also has a processor (not shown here), which is configured to determine a relative height h between the two pressure sensors based on the hydrostatic pressures measured by the pressure sensors. Furthermore, the processor is configured to convert this relative height h, together with the defined distance 7, into an angle of inclination 2 and/or 2' by means of simple trigonometric relationships. The processor is part of a hardware system that has the necessary electronic and microelectronic components, storage media and interfaces to process, store, transmit and receive data and/or signals. The processor can also have a plurality of, in particular functionally linked, separate processors. For example, all these components are mounted on one or more interconnected circuit boards/electronics boards.

In order to obtain an exact measurement for the relative height h, it is crucial that the measurements of the two pressure sensors are taken simultaneously in order to use them as a basis for determining the relative height h.

In an advantageous embodiment of the inclination sensor 1 it has temperature sensors, wherein each pressure sensor is assigned a temperature sensor. The temperature sensors are used to measure the temperature, in particular in the fluid, at the respective pressure sensor. Since the relative height is determined based on the difference between the measured hydrostatic pressures and the hydrostatic pressure depends on the density of the fluid, the hydrostatic pressure of which is measured, a change in the density of the fluid will affect the relative height determined. Such a density change can occur, for example, due to a change in the temperature of the fluid. By measuring the temperature at the pressure sensors where the hydrostatic pressure is measured in each case, it is possible to allow for temperature influences on the density of the fluid in determining the relative height h, for example by using density values of the fluid stored in tables at different temperatures, stored in the form of a "look-up table". This "look-up table" can be used to correct the temperature dependence of the density of the connecting fluid and therefore the height measurement. A temperature dependence of the pressure sensors themselves, which influences the measurement of the pressure sensors, can be determined by means of temperature sensors integrated in the pressure sensors, for example, and the pressure measurement can thus be corrected automatically.

According to a further advantageous embodiment, the inclination sensor 1 can have a synchronizer and pressure sensors and/or temperature sensors that are electrically connected to each other. The purpose of this synchronizer is to ensure that measured hydrostatic pressures and/or temperatures can be assigned to an identical common measurement time. External influences, such as crushing or impacts on the fluid container, can be significantly reduced by using a synchronous pressure measurement at the opposite edge regions. A further measure to reduce external influences on the determination of the relative height is the distributed placement of mechanical damping filters in the fluid, wherein the damping filters are mounted in the fluid container and/or close to the pressure sensors. A filter effect is provided by fins, membranes, or spongy foams. These auxiliary components reduce the fluctuations of the hydrostatic pressure amplitudes of the fluid. The pressure and/or temperature sensors may be designed differently. If these have a trigger signal input designed for this purpose, the synchronizer can generate/use a trigger signal to synchronize the measurement times at which the sensors perform the measurement. For example, the trigger signal can be an electrical trigger signal or a wireless trigger signal, wherein in the case of a wireless trigger signal, the sensors on the opposite edge regions of the fluid container are each connected to a wireless trigger signal receiver, which is configured to trigger sensor measurements based on a received wireless trigger signal. The pressure and/or temperature sensors can also be designed in such a way that they generate measurements continuously and asynchronously, in each case independently with a specific selectable frequency. The synchronizer can then be configured to synchronize these asynchronously generated measurements over time. For example, measurements with a time offset that does not exceed a certain maximum value can therefore obtain a common time stamp. The pressure and/or temperature sensors can also be designed to continuously generate measurements and to signal this with a warning signal when a measurement is generated. In this case, the synchronizer can be configured to assign a common time stamp to the measurements based on the sensor warning signals.

As described above, the relative height is determined by the processor based on a measured hydrostatic pressure difference between the edge regions at which the hydrostatic pressures are measured. For example, the processor can determine the relative height between two pressure sensors, for example by reading from a stored correlation table which assigns hydrostatic pressure differences to specific relative heights. The correlation table is based on a calibration relation. It would also be conceivable that the measured pressure difference is assigned to a relative height by means of a calibration relation. The calibration relation creates an inclination sensor-specific and position-specific relationship between measured pressure differences and relative heights. For example, the calibration table can be a mathematical function which calculates the relative height as a function of the measured pressure difference.

The processor can advantageously have a calibration functionality. The calibration functionality enables a simple (re)calibration of the inclination sensor at any time. During the (re)calibration, the calibration relation is determined. The determination of the calibration relation is based on the positioning of two oppositely located pressure sensors or on the positioning of the edge regions of the fluid container a defined distance apart in the direction of gravity. This defined relative height can be assigned to the measured pressure difference. Based on at least one such assignment of pressure difference to defined relative height, the calibration relation can then be determined by the processor.

Figure 16:
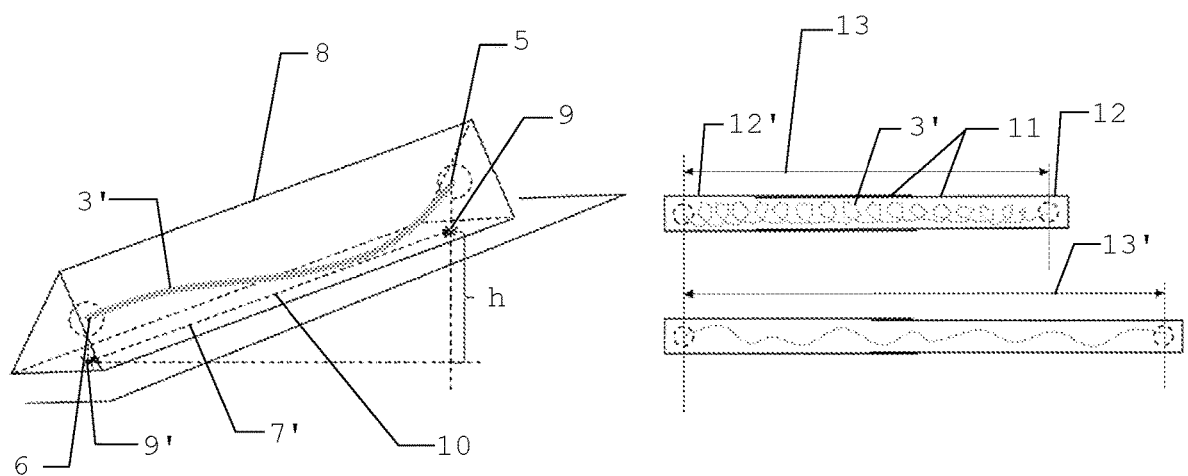

As shown in FIG. 16, the fluid container can be a tube that is stable in shape, or else a hose 3', for example. Advantageously, the inclination sensor can then have a housing 8, which accommodates the tube or hose and the sensors and thereby simultaneously defines and fixes the positional relationship between the pressure sensors 5, 6 and their distance apart. The housing can be advantageously designed in such a way that it has reference points 9, 9', which have a fixed and defined positional relationship to the respective pressure sensor, for example in the form of a reference edge or reference surface, wherein the angle of inclination in relation to the vertical direction can be determined based on the specific relative height h between the two reference points or pressure sensors and the fixed and defined distance 10 between the two reference points or pressure sensors.

As shown schematically in FIG. 16, in a specific embodiment the hose can be a spiral hose 3", for example. The spiral hose has two opposite ends, with corresponding pressure sensors being attached to the ends of the spiral hose. An advantage of the spiral hose is that it is "extensible". Thus, the housing can be a "telescopic" or extensible housing 11, which essentially consists of two housing parts 12, 12'. Each housing part then has one end of the spiral hose which it fixes, and thus also fixes the pressure and/or temperature sensors. The two housing parts of the telescopic housing can be moved relative to each other along a common axis to defined positions. A defined position in this case relates to an "extended" state of the telescopic housing with positions of the housing parts relative to each other, which are defined in the sense that a distance 13, 13' is defined between the ends of the spiral hose and thus also between the pressure sensors. This distance, which changes with the position of the housing parts relative to each other, can be determined and defined by means of an additional distance meter, for example. Similarly, by purely constructional means the telescopic housing could limit the possible adjustable positions of the housing parts relative to each other to predefined positions, the predefined positions being assigned defined distances between the pressure sensors.

Figure 17:
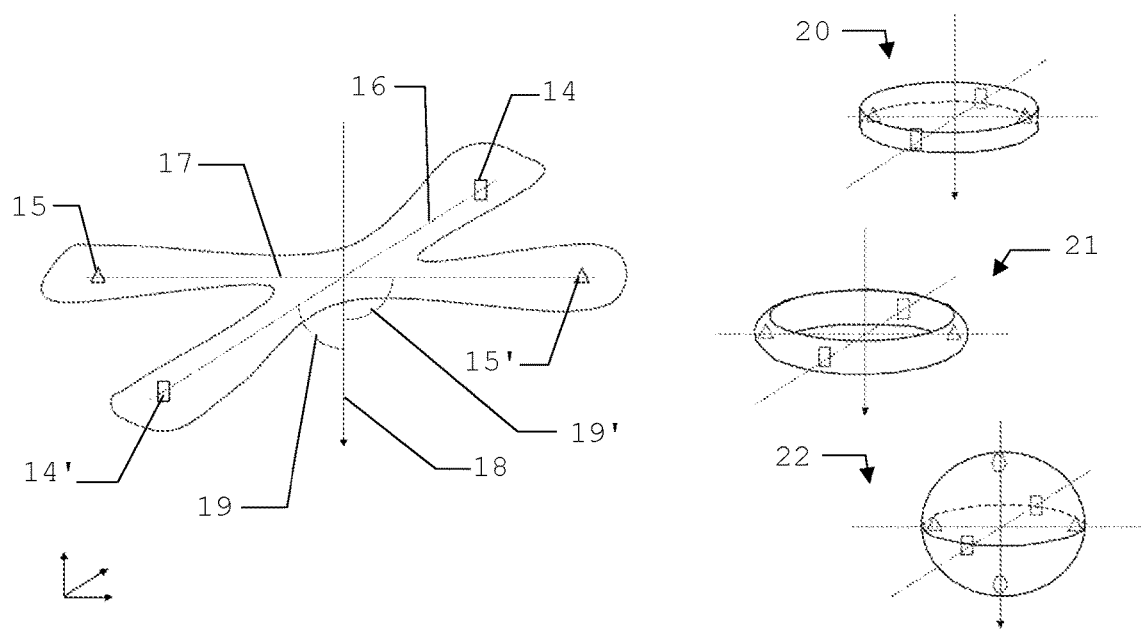

Depending on the embodiment, the inclination sensor can have any number of pressure sensor pairs, as shown in purely exemplary form in FIG. 17. A pressure sensor pair 14, 14' or 15, 15' is typically located on a pressure sensor pair axis 16 or 17, the two pressure sensors being arranged opposite each other on the pressure sensor pair axis with respect to a fluid container centre. The pressure sensor pair axes are advantageously arranged orthogonal to each other, wherein an inclination angle, or inclination relative to the vertical direction 18, can be determined in multiple dimensions 19, 19' corresponding to the number of pressure sensor pairs and pressure sensor pair axes. As shown in FIG. 17, the fluid container can be designed in the shape of a disk or plate 20. The fluid container in this case has two main surfaces, which are substantially parallel to each other. The pressure sensors of the pressure sensor pairs are arranged diametrically opposite each other in the edge region of the fluid container. In an analogous way, the fluid container can be designed in the shape of a toroid 21. Also, in an analogous way, the fluid container could be spherical 22 and have three pairs of pressure sensors, for example.

Figure 18:
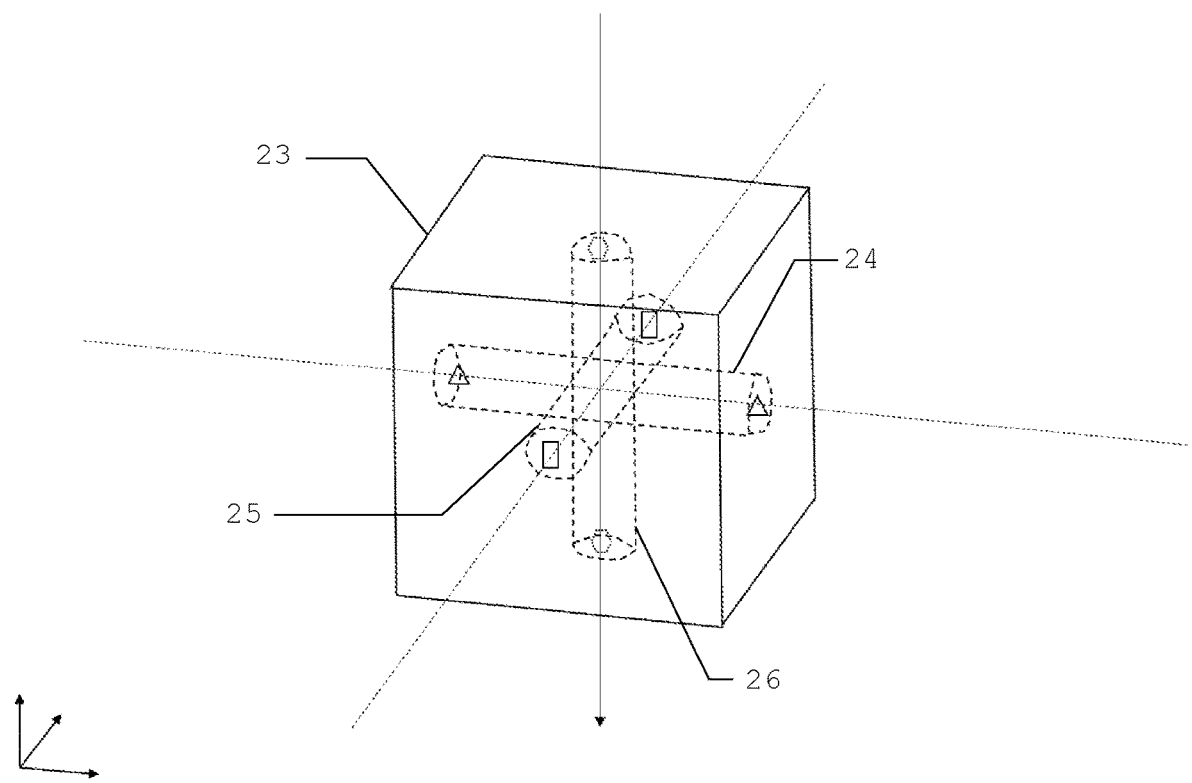

FIG. 18 shows a further possible embodiment of the inclination sensor. The inclination sensor in this case has a cube-shaped fluid container 23 with six cube faces and six pressure sensors, which form three pressure sensor pairs. Each pressure sensor is assigned to a cube face and arranged in the region of the respective cube face. The pressure sensor pairs are each located on a pressure sensor pair axis, the three pressure sensor pair axes being arranged orthogonal to each other. In an advantageous embodiment, the cube-shaped fluid container has a connecting channel to all of the pressure sensors. The connecting channel connects all the pressure sensors to each other. It can be particularly advantageous to connect all sensors to one connecting channel and thus with the same connecting fluid, since this means all sensors are affected by the same "fluid effects", such as a change in density due to a change in temperature.

Regardless of the design of the fluid container, it can have a filling device for filling the fluid container with connecting fluid. Likewise, the fluid container may have a pressure equalization device based on a flexible membrane, for example, in order to adjust the pressure of the connecting fluid in the fluid container to match external conditions. This pressure equalization device controls the adjustment and maintenance of a base pressure of the connecting fluid in the fluid container. The adjustment of this base pressure fulfils an important function, for example in the calibration or re-calibration of the inclination sensor, allowing the prevailing hydrostatic pressures to be adjusted to match the sensitive range of the two pressure sensors. Furthermore, the pressure equalization vessel allows an excess or negative pressure in the fluid container to be limited relative to an external atmospheric pressure. This allows the inclination sensor to be protected from possible damage to the sensors, the fluid container, etc. In addition, this makes air penetration due to potential leakage points in the hydrostatic system unlikely, as the hydrostatic internal pressure is continuously aligned with the external pressure. The fluid container may also have a venting valve. This venting valve allows the removal of trapped air pockets in the fluid container. This allows the accuracy of the measurement to be maintained and in the event of air entering the fluid container, it can be removed again during a recalibration.

According to a further embodiment, the inclination sensor may also have a display, wherein the display is connected to the processor in such a way that different information regarding the hydrostatic pressures, the relative height determined and/or a determined inclination angle/inclination is displayed via the display.

It goes without saying that these figures shown only represent possible exemplary embodiments of first and second aspects in a schematic way. The different approaches can also be combined with each other and with measurement approaches or measuring devices from the prior art.

In the following claims 1 to 10 are related to the first aspects with numerals referring to FIGS. 1 to 14 and claims 11 to 20 are related to the second aspects with numerals referring to FIGS. 15 to 18.

What is claimed is:

1. An inclination sensor for determining an angle of inclination relative to the vertical direction defined by the gravitational field, comprising:
    a fluid container, filled with a fluid which is sealed in a gastight manner against an external atmosphere by said fluid container as a connecting fluid,
    a first pressure sensor pair having a first and a second pressure sensor,
        wherein the first and second pressure sensors are arranged in an edge region of the fluid container such that:
            they are connected to each other by the connecting fluid, and
            have a fixed and defined position with respect to each other and are thus a fixed and defined distance apart, and
        wherein the first and the second pressure sensor are each configured to measure a hydrostatic pressure in the connecting fluid,
    a first and a second temperature sensor, wherein:
    each of the temperature sensors is assigned to a pressure sensor,
    the first temperature sensor is configured to measure the temperature at the first pressure sensor, optionally in the connecting fluid,
    the second temperature sensor is configured to measure the temperature at the second pressure sensor, optionally in the connecting fluid, and
    a processor which is configured:
        to determine a relative height (h) in the direction of gravity between the first and the second pressure sensor based on the hydrostatic pressures measured by the first and second pressure sensor, wherein the measured hydrostatic pressures can be assigned by the processor to an identical common measurement time,
        to determine an angle of inclination with respect to the vertical direction based on the determined relative height (h) and the fixed and defined distance apart of the pressure sensors, and
        to determine the relative height in the direction of gravity and the angle of inclination, also based on the measured temperatures.

2. The inclination sensor according to claim 1, wherein a temperature gradient between the two pressure sensors that is present in the connecting fluid is also taken into account in determining the angle of inclination.

3. The inclination sensor according to claim 1, comprising a synchroniser, wherein the pressure sensors and/or temperature sensors are electrically connected to each other, wherein the synchroniser is configured
    to synchronize a first measurement time, at which the first pressure and/or temperature sensor measures, with a second measurement time, at which the second pressure and/or temperature sensor measures, by means of an electrical trigger signal, or
    to synchronize hydrostatic pressures and/or temperatures measured asynchronously by the pressure sensors and/or temperature sensors over time,
    wherein the measured hydrostatic pressures and/or temperatures can be assigned to an identical common measurement time based on the result.

4. The inclination sensor according to claim 1, wherein
    a first pressure sensor pair has at least one additional first and one additional second pressure sensor, and
    the processor is configured to average the hydrostatic pressures measured by the first pressure sensors and to average the hydrostatic pressures measured by the second pressure sensors and to determine an angle of inclination based on the results.

5. The inclination sensor according to claim 1, wherein the fluid container is a tube or hose with two opposite ends and the first pressure sensor is arranged at one end and the second pressure sensor at the other end of the tube or hose opposite the first end.

6. The inclination sensor according to claim 5, comprising a housing, having the tube or hose, the sensors and the processor, wherein the position and the distance apart of the pressure sensors is fixed and defined by the housing.

7. The inclination sensor according to claim 5, wherein the hose is a spiral hose with two opposite ends and the first pressure sensor is arranged at one end and the second pressure sensor at the other end of the spiral hose opposite the first end.

8. The inclination sensor according to claim 7, comprising a telescopic housing, having the spiral hose, the sensors and the processor, wherein
the position and the distance of the pressure sensors apart is fixed and defined by the telescopic housing,
the telescopic housing has mainly two housing parts, and each housing part fixes one of the two ends of the spiral hose and one pressure sensor, and
the two housing parts can be moved relative to each other along a common axis to defined positions.

9. The inclination sensor according to claim 1, comprising further pressure sensor pairs and in that the pressure sensor pairs are arranged on pressure sensor pair axes arranged at a defined angle relative to each other, orthogonal to each other, and the processor is also configured:
to determine in pairs a relative height in the direction of gravity between two pressure sensors of each pressure sensor pair based on the hydrostatic pressures measured by the two pressure sensors, wherein the hydrostatic pressures measured by the two pressure sensors of each pair can be assigned by the processor to an identical common measurement time, and
to determine at least one angle of inclination to the vertical direction based on a relative height determined in pairs for a pressure sensor pair and the fixed and defined distance between the two pressure sensors of the pressure sensor pair.

10. The inclination sensor according to claim 9, wherein:
the fluid container is shaped like a disk or plate and has two main surfaces substantially parallel to each other, and
the pressure sensors of a pressure sensor pair are arranged opposite each other with respect to a centre of the fluid container designed in the shape of a disk or plate, in the edge region of said container,
and/or
the fluid container is toroidal in shape and has a rotational axis, and
the pressure sensors of a pressure sensor pair are arranged opposite each other with respect to the rotational axis in the region of an outer circumference of the toroidal fluid container,
and/or
the fluid container is spherical and has a sphere centre, and
the pressure sensors of a pressure sensor pair are arranged opposite each other in the edge region of the sphere with respect to the centre of the latter,
and/or
the additional pressure sensor pairs correspond to a second and a third pressure sensor pair with a third, fourth, fifth and sixth pressure sensor,
the fluid container is cube-shaped, in particular having six cube surfaces and a cube centre, and
the pressure sensors of a pressure sensor pair are arranged opposite each other with respect to the cube centre in the region of the cube faces, and each pressure sensor is assigned to one cube surface,
and/or
the cube-shaped fluid container has a connecting channel, which is filled with the connecting fluid and is designed to connect the pressure sensors of at least one pressure sensor pair via the connecting fluid, in particular to connect the pressure sensors of the three pressure sensor pairs to each other via the connecting fluid, wherein the connecting channel has three connecting sub-channels, and two pressure sensors of a pressure sensor pair are assigned to each connecting sub-channel and the connecting sub-channels are designed to connect the two pressure sensors of the respectively assigned pressure sensor pair via the connecting fluid, in particular wherein the three connecting sub-channels are arranged orthogonally to each other,
and/or
the inclination sensor having a pressure equalization vessel, wherein the pressure equalization vessel is configured
to set and maintain constant a base pressure in the fluid container, and/or
to equalize and/or limit an excess or negative pressure in the fluid container with respect to an external air pressure.

11. A device for the determination of relative heights (h) between two points, comprising:
a connecting hose filled with a liquid, with two opposite ends,
a first and a second pressure sensor, arranged at the opposite ends of the connecting hose, wherein the pressure sensors are connected to one another via the liquid and the liquid is sealed from the outside in a gastight manner by the connecting hose, and wherein the first pressure sensor is configured to measure a hydrostatic pressure of the liquid at the one end of the connecting hose in the liquid and the second pressure sensor is configured to measure a hydrostatic pressure of the liquid at the other end of the connecting hose that is opposite to the one end, in the liquid, and
a processor that is configured to determine a relative height between a first reference point with a fixed position to the first pressure sensor and a second reference point with a fixed position to the second pressure sensor on the basis of the hydrostatic pressures measured by the first and second pressure sensors, wherein the measured hydrostatic pressures can be assigned by the processor to the same common measurement time point, and the determination of the relative height (h) takes place on that basis,
wherein the device has further pressure sensors at each end of the connecting hose, wherein the pressure sensors at the respective end of the connecting hose are arranged around a common centre point and have a fixed position to one another, and
wherein the processor is configured:
to determine the relative height (h) on the basis of mean values of the pressures measured by means of the pressure sensors at the respective end of the connecting hose, and/or
to determine an orientation of the respective end of the connecting hose with respect to a reference point on the basis of the pressures measured at the respective end of the connecting hose by means of the pressure sensors, in particular pressure differences, and also to determine the relative height (h) on the basis of the orientation.

12. The device according to claim 11, comprising a first and a second temperature sensor, wherein:
each of the temperature sensors is assigned to a pressure sensor, the first temperature sensor is configured to measure the temperature at the first pressure sensor, in particular in the liquid, the second temperature sensor is configured to measure the temperature at the second pressure sensor, in particular in the liquid, and the processor is configured to determine the relative height (h) also on the basis of the measured temperatures, in particular in order to take thermal influences on the relative height (h) into consideration.

13. The device according to claim 11, comprising a synchronizer, wherein the synchronizer is configured to synchronize a first measurement time point at which the first pressure and/or temperature sensor measures with a second measurement time point at which the second pressure and/or temperature sensor measures, wherein the processor is configured to assign the measured hydrostatic pressures to the same, common measurement time point on the basis of the synchronized measurement time points.

14. The device according to claim 13, comprising:
a respective wireless module at each end of the connecting hose, wherein
the sensors are connected to the respective wireless module, and
the wireless module is configured to receive and to process a wireless trigger signal, and
wherein the synchronizer is configured to synchronize the measurement time points on the basis of a wireless trigger signal, so that the sensors measure pressure and/or temperature in a synchronized manner on the basis of the wireless trigger signal.

15. The device according to claim 11, comprising further temperature sensors, wherein:
the connecting hose comprises multiple temperature measurement regions distributed over its length,
at least one of the further temperature sensors is assigned to each temperature measurement region,
the further temperature sensors are configured to measure the temperature in the assigned temperature measurement region, in particular in the liquid, and
the processor is configured to determine the relative height (h) also on the basis of the temperatures measured in the temperature measurement regions of the connecting hose, in particular in order to take thermal influences on the relative height (h) into consideration.

16. The device according to claim 11, wherein the connecting hose:
comprises a first and a second hose compartment,
the hose compartments are separate from one another and extend adjacent to one another along the connecting hose,
the first hose compartment is filled with the liquid connecting the pressure sensors and the second hose compartment provides a circulation region for a medium that can move therein.

17. The device according to claim 11, wherein multiple reference points with a fixed position to the pressure sensor are assigned to a pressure sensor.

18. The device according to claim 11, comprising a respective orientation measuring module at both ends of the connecting hose, wherein the orientation measuring modules comprise at least one acceleration sensor and are configured to determine the orientation of the respective pressure sensor to a reference point with a fixed position to the respective pressure sensor, and the processor is configured to determine the relative height (h) on the basis of the orientation of the pressure sensors and/or by a pressure compensating vessel at one end of the connecting hose, wherein the pressure compensating vessel is configured
to establish and hold constant a base pressure in the connecting hose, and/or
to compensate for and/or limit an excess or negative pressure in the connecting hose with respect to an external air pressure,
wherein the respective components are integrated into a respective housing, designed and configured to be hand-carried, at each end of the connecting hose.

19. The device according to claim 11, comprising:
an optical position-resolving detector (OAD) at one end of the connecting hose, wherein the optical OAD has a fixed position to the pressure sensor and is configured to detect optical reference radiation in a position-sensitive manner at an OAD point, and wherein the processor is configured to ascertain an OAD height between the pressure sensor and the OAD point, and to determine the relative height (h) on the basis of the OAD height, in particular to determine the relative height (h) between a reference point and the OAD point,
and/or
a display and/or an input keyboard with operating fields at least one end of the connecting hose, wherein the processor is configured:
to display, at the respective end of the connecting hose, information relating to the measured temperatures and pressures, in particular relative height positions of the connecting hose ends and the relative height (h) via the display, and/or
to execute instructions that are input via the operating fields of the input keyboard,
and/or
an optical distance measuring device with an inclination sensor at one end of the connecting hose, wherein the optical distance measuring device has a fixed positional and orientation to the pressure sensor and is configured to measure absolute distances to targeted points by means of optical distance measuring radiation, and wherein the processor is configured to determine the relative height (h″) between the one first reference point and the point targeted by the optical distance measuring device on the basis of the determined relative height (h) between the one first and the one second reference point, an inclination of the optical distance measuring radiation measured by means of the inclination sensor, and the distance measured to a targeted point,
and/or
a coupling device at least one end of the connecting hose, wherein the coupling device is configured to couple and then uncouple further measuring devices, and to provide an accordingly coupled or uncoupled state to the processor as a coupling status,
an electronic identification mark at least one end of the connecting hose, and
a reading device for electronic identification marks,
wherein the processor is configured to determine a relative height (h, h′, h″) also on the basis of at least one electronic identification mark read by the reading device and on the basis of the coupling status,
and/or
a reflector at one end of the connecting hose, wherein the reflector comprises a reference point that has a fixed position to the pressure sensor and is configured to reflect reference radiation of a measuring device, wherein the determination of the relative height takes place on the basis of the reference point of the reflector, and/or a signal generator, wherein the processor is connected to the signal generator and is configured to output a signal via the signal generator on the basis of a predefined criterion that relates to the determination of a relative height, and/or a respective electronic board at both ends of the connecting hose comprising a wireless module, a orientation measuring module, a temperature sensor and a pressure sensor and connects them to one another via a data connection, a first connecting piece at the one end of the connecting hose, a second connecting piece at the other end of the connecting hose that is opposite to the one end, and a tablet computer or a smartphone wherein the first connecting piece rigidly connects the connecting hose, the pressure sensor, a pressure compensation vessel and a bleed valve together, and the second connecting piece connects the connecting hose and the pressure sensor rigidly together, wherein the connecting hose is pulled in each case over a connecting region of the first and second connecting piece, and wherein the wireless modules and the tablet computer or the smartphone provide a data connection between them in order to control the device, and/or a first extensible electronic measuring tape with a distance transducer at one end of the connecting hose, wherein the distance transducer is configured to assign, to an extended state of the measuring tape, a distance (D) thereby surveyed with respect to the one end of the connecting hose, in particular wherein the measuring tape comprises a fixed end and an extensible end, and the extensible end is attached to the other end opposite to the one end of the connecting hose, and the processor is configured to determine a horizontal distance (d) between the two ends of the connecting hose on the basis of the determined relative height (h) and the distance (D) surveyed between the two ends of the connecting hose, and/or a second extensible electronic measuring tape at the one end of the connecting hose, wherein the first and second measuring tapes form a unit, the unit comprises an angle transducer, and the angle transducer is configured to determine a measured angular value for an angle enclosed between a distance (D) surveyed by means of the first measuring tape and a distance (D') surveyed by means of the second measuring tape, and/or the processor being configured to be remotely controlled by a mobile computer with a display, in particular a touchscreen, and to display information relating to the measured temperatures and pressures, in particular relative height positions of the connecting hose ends and the relative height (h) via the display of the mobile computer, and/or a holder at least one end of the connecting hose, wherein the holder is designed to receive and fix a mobile computer in place.

20. An inclination sensor for determining an angle of inclination relative to the vertical direction defined by the gravitational field, comprising:

a fluid container, filled with a fluid which is sealed in a gastight manner against an external atmosphere by said fluid container as a connecting fluid, a first pressure sensor pair having a first and a second pressure sensor, wherein the first and second pressure sensors are arranged in an edge region of the fluid container such that:

they are connected to each other by the connecting fluid, and have a fixed and defined position to each other and are thus a fixed and defined distance apart, and wherein the first and the second pressure sensor are each configured to measure a hydrostatic pressure in the connecting fluid, a processor which is configured:

to determine a relative height (h) in the direction of gravity between the first and the second pressure sensor based on the hydrostatic pressures measured by the first and second pressure sensor, wherein the measured hydrostatic pressures can be assigned by the processor to an identical common measurement time, and to determine an angle of inclination with respect to the vertical direction based on the determined relative height (h) and the fixed and defined distance apart of the pressure sensors, and a synchroniser, wherein the pressure sensors and/or temperature sensors are electrically connected to each other, wherein the synchroniser is configured:

to synchronize a first measurement time, at which the first pressure and/or temperature sensor measures, with a second measurement time, at which the second pressure and/or temperature sensor measures, by means of an wireless trigger signal, wherein the measured hydrostatic pressures and/or temperatures can be assigned to an identical common measurement time based on the result.

\* \* \* \* \*